United States Patent
Arrison et al.

(10) Patent No.: US 12,008,812 B2
(45) Date of Patent: Jun. 11, 2024

(54) SIMULTANEOUS PLAYBACK OF CONTINUOUS VIDEO RECORDINGS FROM MULTIPLE RECORDING DEVICES

(71) Applicant: Alarm.com Incorporated, Tysons, VA (US)

(72) Inventors: Meredith Arrison, Dumfries, VA (US); Sean Gallahan, Washington, DC (US); Adam Brandfass, Pittsburgh, PA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/490,834

(22) Filed: Sep. 30, 2021

(65) Prior Publication Data
US 2022/0101630 A1    Mar. 31, 2022

Related U.S. Application Data

(60) Provisional application No. 63/085,678, filed on Sep. 30, 2020.

(51) Int. Cl.
*G06V 20/40* (2022.01)
*G06F 16/74* (2019.01)
*G06F 16/78* (2019.01)
*G06V 20/52* (2022.01)

(52) U.S. Cl.
CPC ............ *G06V 20/49* (2022.01); *G06F 16/743* (2019.01); *G06F 16/7867* (2019.01); *G06V 20/44* (2022.01); *G06V 20/46* (2022.01); *G06V 20/52* (2022.01)

(58) Field of Classification Search
CPC ........ G06V 20/49; G06V 20/52; G06V 20/46; G06V 20/44; G06F 16/7867; G06F 16/743
See application file for complete search history.

(56) References Cited

U.S. PATENT DOCUMENTS

| | | |
|---|---|---|
| 6,760,536 B1 | 7/2004 | Amir et al. |
| 2008/0124055 A1* | 5/2008 | Shahraray ............. G06F 16/743 348/E5.007 |
| 2010/0169786 A1 | 7/2010 | O'Brien et al. |
| 2014/0055610 A1* | 2/2014 | Ko ............................ G06T 7/11 348/143 |
| 2017/0262697 A1* | 9/2017 | Kaps .................... G11B 27/022 |
| 2018/0113577 A1* | 4/2018 | Burns ................ H04N 21/8456 |
| 2018/0232592 A1* | 8/2018 | Stewart ............ G08B 13/19606 |

* cited by examiner

*Primary Examiner* — Sunghyoun Park
(74) *Attorney, Agent, or Firm* — Fish & Richardson P.C.

(57) ABSTRACT

Methods and systems, including computer programs encoded on a computer storage medium, are disclosed for simultaneous playback of continuous video recordings from multiple recording devices. A system obtains respective video data generated by multiple recording devices. Each video data includes multiple image frames. For each recording device: based on a time value, the system identifies events captured in the video data generated by the recording device. Based on an input variable corresponding to the events, the system: i) identifies an event stream that coincides with occurrence of a particular event captured in the video data; ii) determines a control value for segmenting image frames of the event stream; and iii) based on the control value, generates a video segment in response to isolating image frames of the event stream coinciding with the particular event. A graphical interface is generated that concurrently outputs each video segment for each recording device.

20 Claims, 9 Drawing Sheets

SIMULTANEOUS PLAYBACK OF CONTINUOUS VIDEO RECORDINGS FROM MULTIPLE RECORDING DEVICES

CROSS REFERENCE TO RELATED APPLICATION

This application claims the benefit of U.S. Provisional Application No. 63/085,678, filed on Sep. 30, 2020, which is incorporated herein by reference in its entirety.

FIELD

This specification relates to imaging and video recording devices.

BACKGROUND

Recording devices and related imaging sensors are often dispersed at various locations at a property, such as a home or commercial business. These devices and sensors can have distinct functions at different locations of the property. Some recording devices at a property offer different types of monitoring and control functionality. The functionality afforded by these devices can be leveraged to monitor or secure items and personnel at a property, to obtain information about respective items at multiple different properties, and to determine a status of certain objects or devices that may be located at the properties.

SUMMARY

This document describes techniques for implementing simultaneous playback of continuous video recordings from one or more recording devices or cameras. The techniques provide improvements in monitoring, searching, and detecting items or times of interest in recorded video data. For example, a computing system can implement the disclosed techniques to reduce time spent browsing or playing back video data without a requirement of increasing a playback speed of the video data. The system can perform processes for simultaneous playback of recorded image content that allow for capturing and identification of events that take place between certain individual frame sequences of the content, such as between thumbnail images.

The system is configured to execute an example frame-selection algorithm that supports variable speed playback and allows for accurate browsing or searching of items and times of interest in continuous video recordings. The continuous video recordings may be captured by a single recording device or by multiple recording devices. The system is configured to perform simultaneous playback of sequential video segments from a continuous recording at least by generating multiple equal length segments of the recording based on a selected duration (e.g., a user specified duration). The system performs this function for a single recording device or for multiple recording devices.

The system can perform intelligent grid selection when generating the equal length segments, rather than relying solely on input from a user to determine a number of video segments to generate for a given duration. For example, when segmenting video content for simultaneous playback at a device, the system can perform the intelligent grid selection based on characteristics of the device used to output the segmented video. The system also executes event and region driven video segmentation when performing simultaneous playback of a recording. For example, the system uses inputs such as sensor data (e.g., for detected motion), weighted and unweighted variables, or terms specifying a region to refine how the video segments are isolated for output to a user based on a given region of focus or event stream.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

BRIEF DESCRIPTION OF THE DRAWINGS

Like reference numbers and designations in the various drawings indicate like elements.

DETAILED DESCRIPTION

Figure 1A:
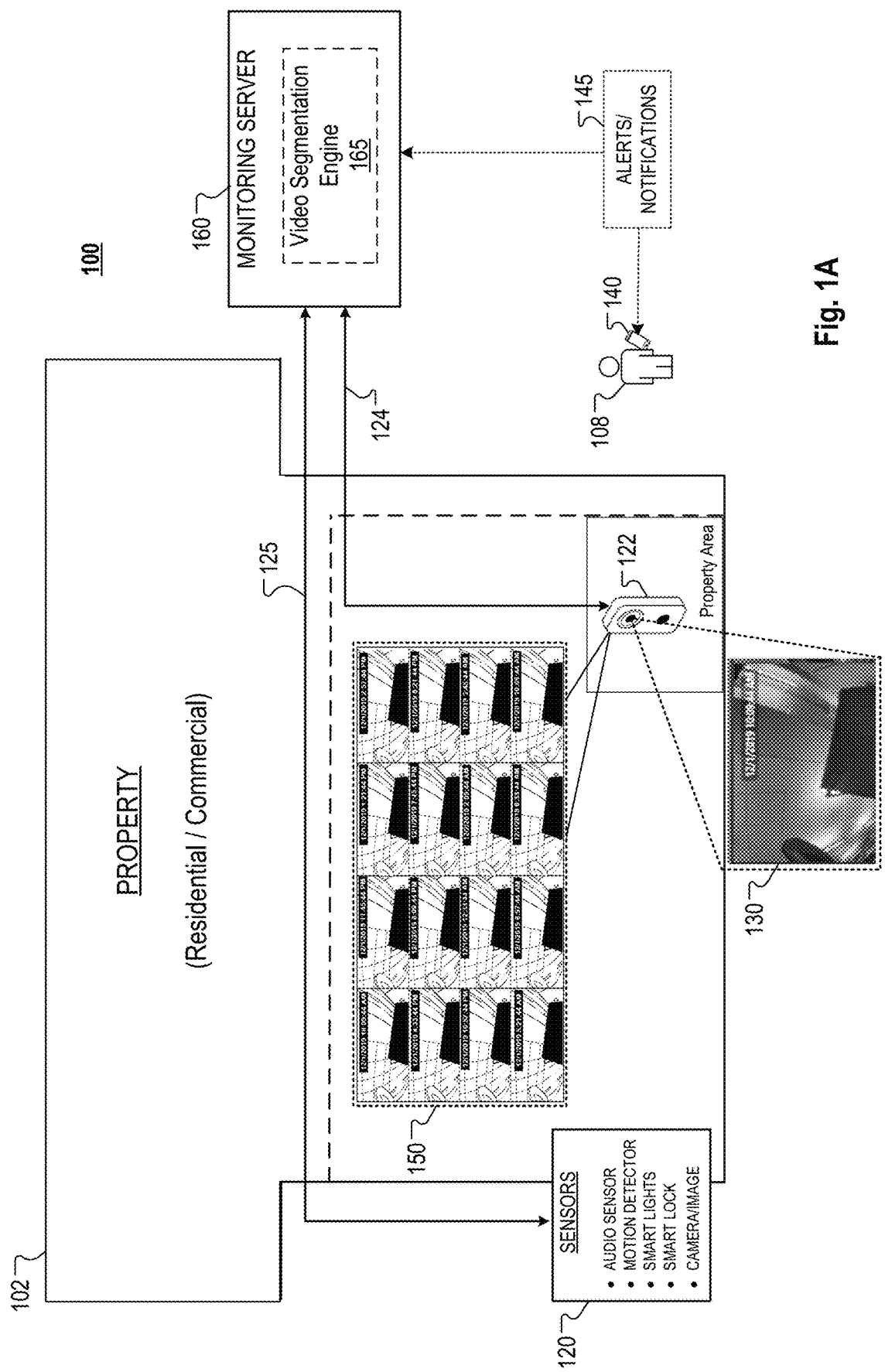
FIG. 1A is a block diagram of an example property monitoring system that performs simultaneous playback of continuous video recordings.

FIG. 1A shows a block diagram of an example property monitoring system 100 ("system 100") that can be used to perform one or more actions for securing a property 102. More specifically, the system 100 is configured to generate individual video segments using image frames that are isolated (or filtered) from a larger portion of video data. The individual video segments generated from the image frames are used to perform simultaneous playback of continuous video recordings obtained by a camera or other recording device at the property 102. The property 102 may be, for example, a residence, such as a single family home, a townhouse, a condominium, or an apartment. In some examples, the property 102 may be a commercial property, a place of business, or a public property, such as a police station, fire department, or military installation.

The system 100 can include multiple sensors 120. Each sensor 120 can be associated with various types of devices that are located at property 102. In some cases, the various types of devices may be located off the property 102, such as at a boundary area that is external to the property, to monitor entrance to and exit from the property. For example, a sensor can be associated with a video or image recording device located on or off of the property 102, such as a digital camera or other imaging/recording device. In some implementations, a sensor(s) is operable to communicate with an imaging device and associated mechanisms used to perform surveillance of different areas at the property or determine whether items have been stolen or removed from a particular location of the property. Sensors 120 can also be used to present status indications, including alerts and notifications, (described below) to residents or occupants, including any stakeholder, of the property 102.

The system 100 can include a control unit that is used to send sensor data 125, obtained using sensors 120, to a remote monitoring server 160. The system 100 also includes a video recording device, referred to generally as camera 122, that is operable to generate image and video data for processing at the monitoring server 160 to generate video segments based on input criteria received by the monitoring server 160. In general, recording and imaging devices at a property 102 may include one or more cameras 122. In the illustration of FIG. 1, the camera 122 is as an example doorbell camera 122. Some doorbell cameras capture images and video in response to detecting motion at property. For example, the doorbell camera can capture images and video of a visitor or owner of the property when the individual is detected at an entrance of the property. The owner can be represented as user 108 in the example of FIG. 1.

The sensors 120 can receive, via an example network at the property 102, a wireless (or wired) signal that controls operation of each sensor 120. For example, the signal can cause the sensors 120 to initialize or activate to sense activity at the property 102 and generate sensor data 125. The sensors 120 can receive the signal from monitoring server 160 or from a camera 122 that communicates with the monitoring server 160. In addition to detecting and processing wireless signals received via the network, the sensors 120 can also transmit wireless signals that encode sensor data 125.

The monitoring server 160 receives and analyzes the sensor data 125 encoded in wireless signals transmitted by the sensors 120. For example, the monitoring server 160 analyzes the sensor data 125 encoded in the wireless signals to determine or obtain information about activities occurring at the property 102, such as whether a person or vehicle is approaching or leaving the property 102 as well as items (e.g., packages) that may be present at the property 102. As described in more detail below, the monitoring server 160 performs various functions related to processing, analyzing, or monitoring video and image data 124 as well as sensor parameter values included in the sensor data 125.

The camera 122 can be a security camera or doorbell camera 122 configured to record or obtain image and video data relating to an example video recording 130. The camera 122 may be affixed or installed at an entrance of the property 102, for example, to detect respective events or occurrences of individuals being within a threshold proximity of the property. The camera 122 may include a processor, a chipset, a memory system, or other computing hardware. In some cases, the camera 122 may include application-specific hardware, such as a field-programmable gate array (FPGA), an application-specific integrated circuit (ASIC), or other embedded or dedicated hardware. The camera 122 may also include software, which configures the device to perform the functions described in this document.

The camera 122 can be a computer system or other electronic device configured to communicate with the sensors 120 and an example control unit to obtain video and sensor data that are indicative of events and activities at the property 102. As described below, the video and/or sensor data can include data corresponding to an event stream. The event stream can be a sequence or subset of sensor data and/or image frames that include content relating to an event. For example, the content can show an individual that carries out the event. The content can also show an entity or item (e.g., a pet or vehicle) that is involved in the event as well. For example, the event can involve a person entering a room, a vehicle moving along an area, or a pet roaming property.

In some implementations, the camera 122, control units, monitoring servers, or other computing modules described herein are included as sub-systems of the property monitoring system 100. The camera 122 is configured to generate video data (e.g., representing an input video or recording stream) based on person-triggered motion detection. For example, the camera 122 can generate an input video stream based on detection of a person within a threshold distance of the property or the entrance area. In some implementations, the camera 122 generates the input video stream based on a proximity sensor, a motion sensor, images frame analysis, or combinations of each.

The monitoring server 160 is configured to perform various functions for analyzing and monitoring conditions at the property 102 and to generate video segments for simultaneous playback of continuous video recordings obtained, as video data 124, from multiple different cameras 122 at the property 102. For example, the monitoring server 160 can perform these functions based on the video data 124 and other sensor data 125 encoded in wired or wireless signal transmissions received by the monitoring server 160. More specifically, the monitoring server 160 includes a video segmentation engine 165 configured to perform the various functions for generating video segments and grid outputs in response to analyzing multiple video segments (or frames) 150 included in a video recording 130.

As described in more detail below, the video segmentation engine 165 can include a set of modules, where some (or all) of the modules interact to process image frames in video segments 150 of an input video stream. The input video stream can be generated by a single camera 122 or by multiple cameras 122. In response to processing the image frames, the video segmentation engine 165 can generate individual video segments from the image frames that coincide with the event stream in a respective video data generated by a particular camera 122. A particular event of the event stream may be captured in each of the respective video data generated by some (or all) of the multiple recording devices. The video segmentation engine 165 can generate a graphical interface that includes an output grid configured to concurrently output the individual video segments that correspond to each of the cameras 122.

The system 100 is configured to output the graphical interface, for example, as a notification 145 for display at a mobile/client device 140 controlled by the user 108. For example, based on output signal data generated by the video segmentation engine 165, the monitoring server 160 can use the graphical interface and corresponding output grid to concurrently present the individual video segments, for each of the multiple cameras 122, at a display of the device 140. In some implementations, the user 108 uses the mobile device 140 to interact with a smart home application to receive the alert/notification 145 generated by the system 100.

Figure 1B:
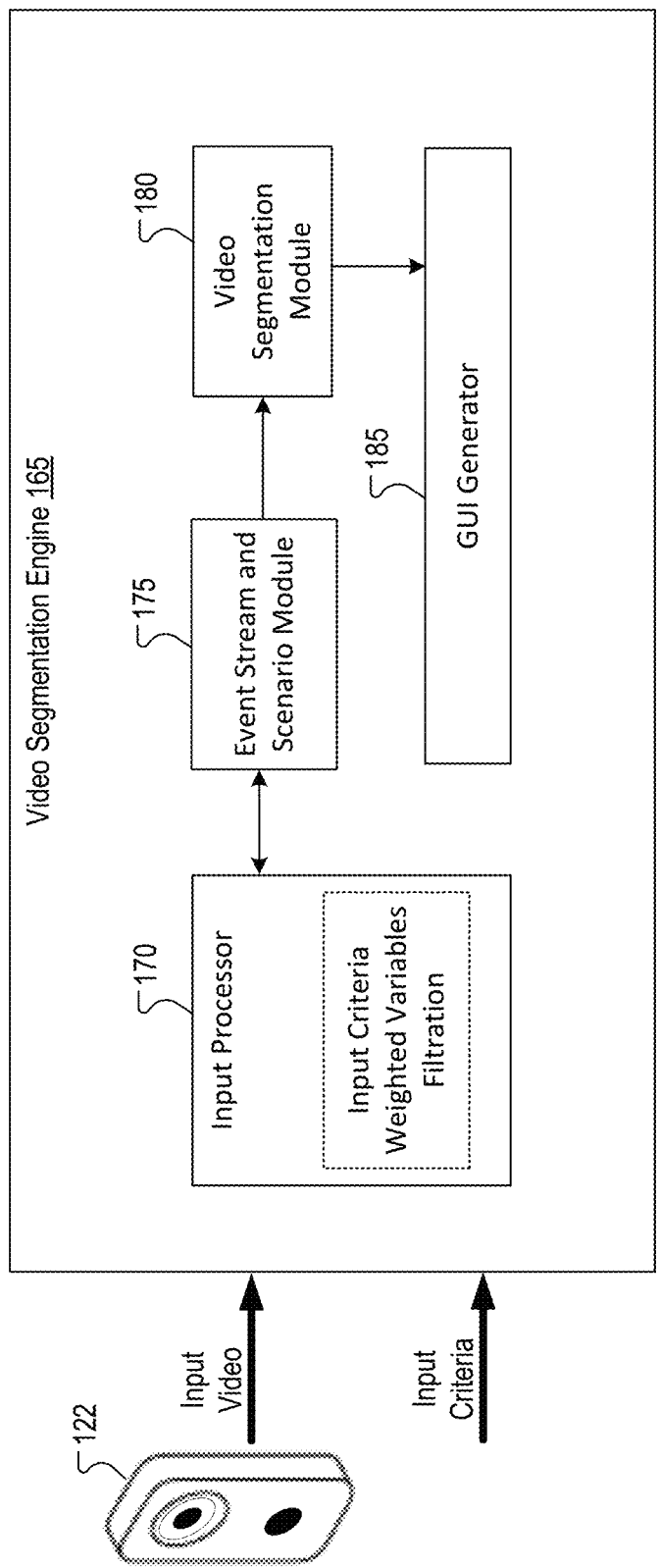
FIG. 1B is a block diagram of an example video segmentation engine for implementing simultaneous playback of continuous video recordings.

FIG. 1B is a block diagram of the example video segmentation engine 165 for implementing simultaneous playback of continuous video recordings, as described above. The video segmentation engine 165 generally includes an input processor 170, an event stream module 175, a segmentation module 180, and an interface generator 185.

The input processor 170 is configured to receive and process input criteria, weighted or unweighted variables, and filtration parameters. The input processor 170 is configured to pass data values and results of processing the input criteria to the event stream module 175. The event stream module 175 exchanges data communications with the input processor 170 to identify event streams in a video recording, such as video content indicated as input video that is received from the camera 122. More specifically, the event stream module 175 uses inputs corresponding to result outputs (e.g., results from processing the input criteria) and data values passed by the input processor 170 to determine or identify an event stream of interest to a user in video data generated by camera 122.

The input criteria can include time values, duration values, and parameters for filtering out portions of video content that do not align with events or an event stream of interest to a user. The time value can be representative of a time, a date, or both. The duration values are processed with reference to the time value to specify a duration or length of video content to be played back relative to start time specified by the time value. The input criteria can also include a number of equal sized video segments (n) that are to be created from an example video recording. The data values of the input criteria can be user specified, system defined, or both. In some implementations, the input criteria includes an event (e) or region of focus under investigation. These input criteria are described in more detail below with reference to FIG. 4-FIG. 6.

The segmentation module 180 is configured to parse, split, or otherwise segment individual frames or sets of frames of video content that align with the input criteria or that correspond to an identified event or region of focus in a frame that is of interest to the user. The segmentation module 180 generates an output indicating the respective segmented portions of the video content to be displayed and provides the output to the interface generator 185. The interface generator 185 uses the output of the segmentation module 180 to determine an allocation of video segments to a respective grid portion of a graphical interface and generates the graphical interface for output at a display of a computing device.

In some implementations, the interface generator 185 determines the allocation and generates the graphical interface based on at least on the number of equal sized video segments (n) specified in the input criteria. In some other implementations, the interface generator 185 determines the allocation and generates the graphical interface based on characteristics of a display or computing device to be used for presenting the graphical interface.

Simultaneous Playback of Sequential Video Segments from a Continuous Recording.

Figure 2:
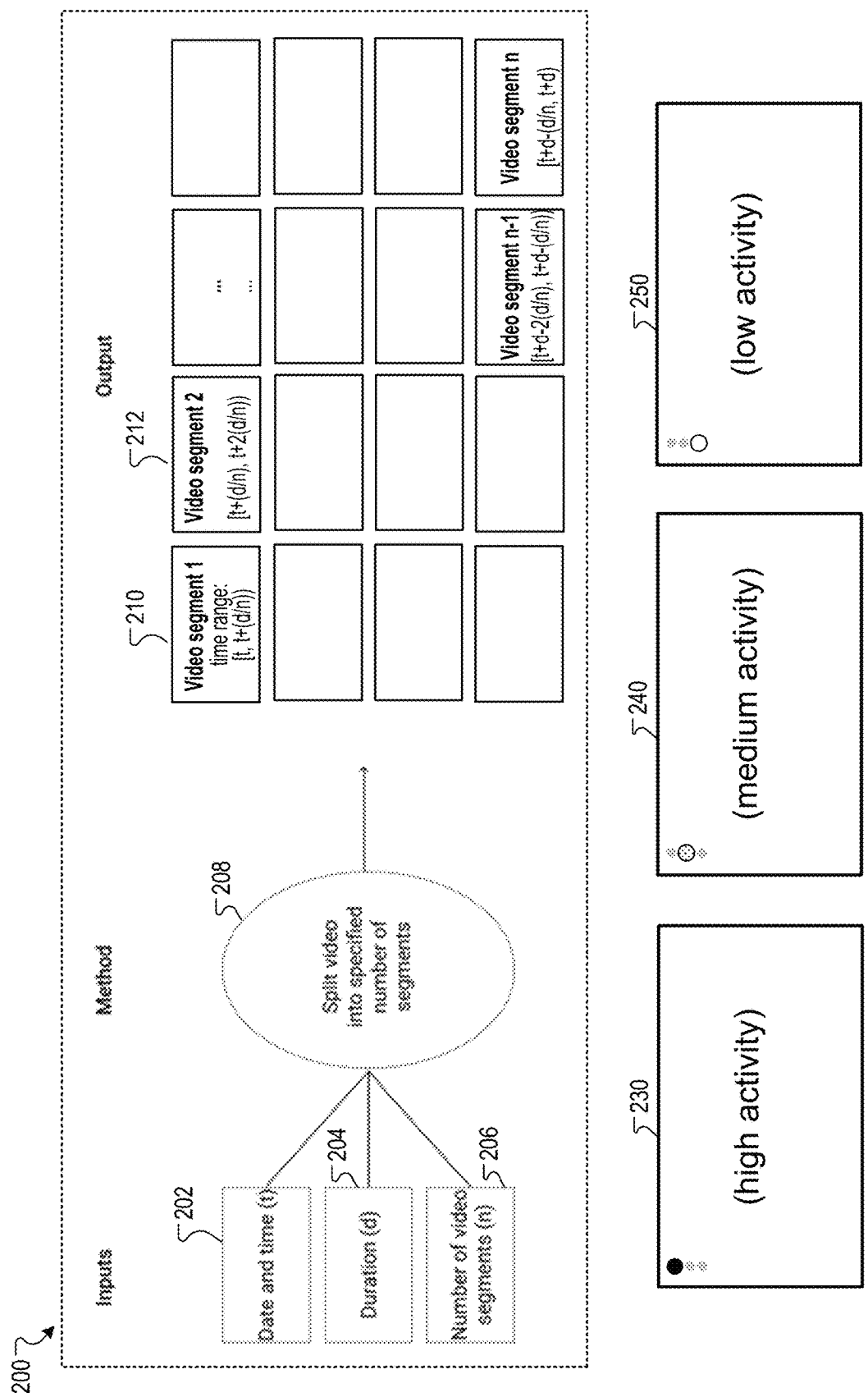
FIG. 2 shows a flow diagram for segmenting video content from a single recording device.

FIG. 2 shows a flow diagram 200 for segmenting video content from a single recording device. Descriptions for the example implementation of FIG. 2 may also apply to multiple recording devices, as will be discussed in more detail below with reference to at least FIG. 3-FIG. 6.

In general, surveillance solutions for building security and property management make use of split-screen playback for simultaneous observation of video content. Prior approaches for observing video content use split-screen playback to display a single playback frame for each of one or more cameras rather than multiple playback frames for a single camera. For example, some duplex multiplexers are operable to allow displays of up to 16 cameras on a single monitor. But, while these duplex multiplexers support split-screen playback, a limitation of these prior approaches is that each picture in the grid must correspond to a unique camera.

To address the limitations of these prior approaches, techniques are described for faster browsing or playing back of recorded video content at least by splitting the video data (e.g., one or more frames) of a selected duration from a single camera into smaller video segments. For example, the video content may be split or segmented into smaller video segments with equal length. The video segmentation engine 165 can generate a graphical interface that is configured to display a grid of the video segments. The graphical interface is operable to play, simultaneously, each video segment of a respective grid position in the graphical interface.

The flow diagram 200 illustrates inputs, a method(s), and outputs associated with the techniques for faster browsing, which can be implemented or executed using the system 100. The inputs to the method are the desired start time (t) of the video segment (202), the duration (d) of the video segment (204), and a number of equal sized video segments (n) that are to be created from the specified recording (206). Using one or more of these inputs (e.g., (t), (d), (n)), an example video recording can be partitioned into n video segments of equal size and displayed in a grid (208). In this example n is an integer greater than or equal to 1. The output is representative of a graphical interface that includes multiple grid portions.

Each example grid portion 210, 212 can correspond to a respective video segment and each video segment can correspond to an individual image frame of the video content. In some implementations, text at the bottom of a grid that displays content for a given frame indicates a timespan included in the video segment. For example, a first frame in the grid contains video data from time range t to t+(d/n), indicated in FIG. 2 as [t, t+(d/n)]. In some cases, each frame that follows a prior frame includes content for a timespan that immediately follows the end of the frame corresponding to the previous segment and to (d/n) time units later, indicated in FIG. 2 as [t+(d/n), t+2(d/n)].

In some implementations, when the video segmentation engine 165 performs simultaneous playback of recorded video/image content each playback frame in the grid continues to progress forward in time until reaching the beginning time of the next segment. In some implementations, before a recording is played, a first i-frame of each video segment of the recording is displayed as a thumbnail output using a grid layout of a graphical interface. Simultaneous playback of recorded video/image content can include each grid portion that plays back a particular video segment or frame playing its respective video segment concurrent with every other grid portion playing back its particular video segment.

As indicated above, in the example of FIG. 2, the video segments presented in the grid are recorded data from the same camera. However, the described functionality can be applied equally to multiple cameras or recording devices. Each video segment that includes motion can contain an example visual indicator that conveys an amount of detected motion in the segment. In some implementations, the amount of detected motion is determined based on a number of pixel changes observed in the video segment. In some other implementations, various known methods of motion detection can be used.

Referring again to FIG. 2, a visual indicator 230 indicates a video segment contains "high activity" for detected motion, a second a visual indicator 240 indicates a video segment contains "medium activity" for detected motion, and a third a visual indicator 250 indicates a video segment contains "low activity" for detected motion. Other types of visual indicators may be used. In some implementations, an icon of any form indicating a level of activity may be overlaid onto an image frame that is played back in a particular grid portion. Although the example of FIG. 2 shows three levels of activity corresponding to high, medium, and low, any number of levels or icons may be used to convey a level of activity detected.

In some cases, the visual activity indicators allow users to focus attention to frames with the most detected motion and, therefore, a higher chance of including an event of interest. Some or all of the implementations for simultaneous or concurrent playback can incorporate or support visual indicators for conveying amounts of detected motion in a segment.

Simultaneous Playback of Sequential Video Segments from Multiple Cameras.

Figure 3:
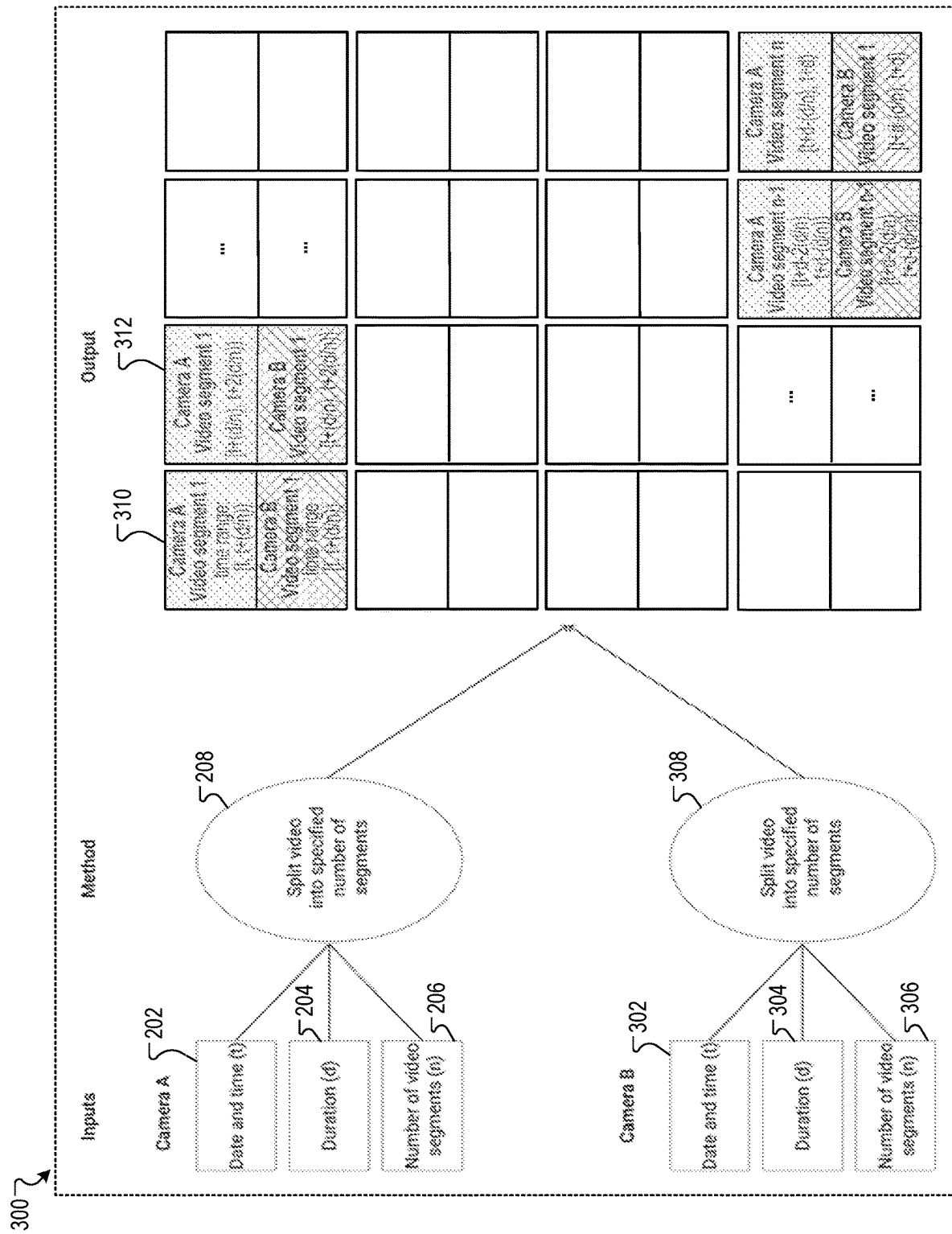
FIG. 3 shows a flow diagram for segmenting video content from multiple recording devices.

FIG. 3 shows a flow diagram 300 for segmenting video content from multiple recording devices. As discussed above, the video segmentation engine 165 of system 100 is configured to execute an example frame-selection algorithm (described below) that supports variable-speed video playback and allows for accurate browsing/searching of items, events, and times of interest in one or more continuous video recordings captured by multiple cameras 122.

For example, the video segmentation engine 165 is configured to perform simultaneous playback of sequential video segments from a respective continuous recording captured multiple distinct cameras 122. The video segmentation engine 165 can perform this playback function by generating multiple equal length segments of each video recording based on a respective set of input criteria. In some implementations, each set of input criteria, and its corresponding data values, are specific to the continuous recording generated by a particular camera 122 of the multiple cameras 122.

The flow diagram 300 illustrates inputs, a method(s), and outputs associated with techniques for faster browsing of continuous video recordings generated by multiple cameras 122. The techniques include concurrent or simultaneous display of different video segments for each recording at a particular grid portion of a graphical interface. The inputs to the method include input criteria for camera A, which corresponds to the inputs described above with reference to FIG. 2. The inputs to the method also include input criteria for camera B, such as the desired start time (t) of a video segment (302), the duration (d) of the video segment (304), and a number of equal sized video segments (n) that are to be created from the specified recording captured by camera B (306).

The video segmentation engine 165 can use one or more of the data values or inputs (e.g., (t), (d), (n)) in the respective input criteria for camera A to determine a partitioning of an example video recording into n video segments of equal size for presentation in a grid or grid portion that is output at a display. Likewise, input criteria for camera B, such as time values, duration values, and a number of equal sized video segments (n), are used to determine a partitioning or segmenting of an example video recording into n video segments of equal size for presentation in the grid or grid portion output at the display (308). The output is representative of a graphical interface that includes multiple grid portions and a single grid portion 310 or 312 can be used to concurrently present partitioned video segments corresponding to camera A and camera B.

The techniques of flow diagram 300 for faster browsing of recorded video content from multiple cameras builds upon the technique described above for a recording from a single camera (FIG. 2). In some implementations, when multiple cameras are of interest to a user, the video segments from each camera are displayed together in the grid. For example, in a graphical interface that includes multiple grid portions, a single grid (or grid portion) can be used to concurrently present partitioned video segments corresponding to multiple cameras 122, such as cameras A, B, and C.

In some implementations, an output grid of a graphical interface dynamically adjusts to support more than two cameras. The system 100 is operable to dynamically adjust attributes of the graphical interface using computations that are performed, e.g., by the interface generator 185, based on the video data obtained from the multiple cameras. For example, the system 100 and graphical interface generator 185 can determine the correct number of segments to be displayed in the interface based at least on the number of cameras, including image acquisition attributes of the camera or video data that indicates the number of segments per camera. In some implementations, the system 100 determines a control value for segmenting the image frames of an event stream, such as frames that show, or coincide with, the occurrence of a particular event. The system 100 is operable to order the segments in any way to facilitate display at the graphical interface. The video segments from each camera that are grouped can be configured to start and end at the same date and time, for example, based on the input criteria that is applied to a respective recording of each camera 122. The structure and/or organization of the output grid is not restricted to the depiction of FIG. 3. For example, the video segments from each of the multiple cameras may be arranged in any manner to facilitate improved concurrent viewing of multiple segments by the user.

Simultaneous Playback of Sequential Video Segments Using Smart Grid Selection.

Figure 4:
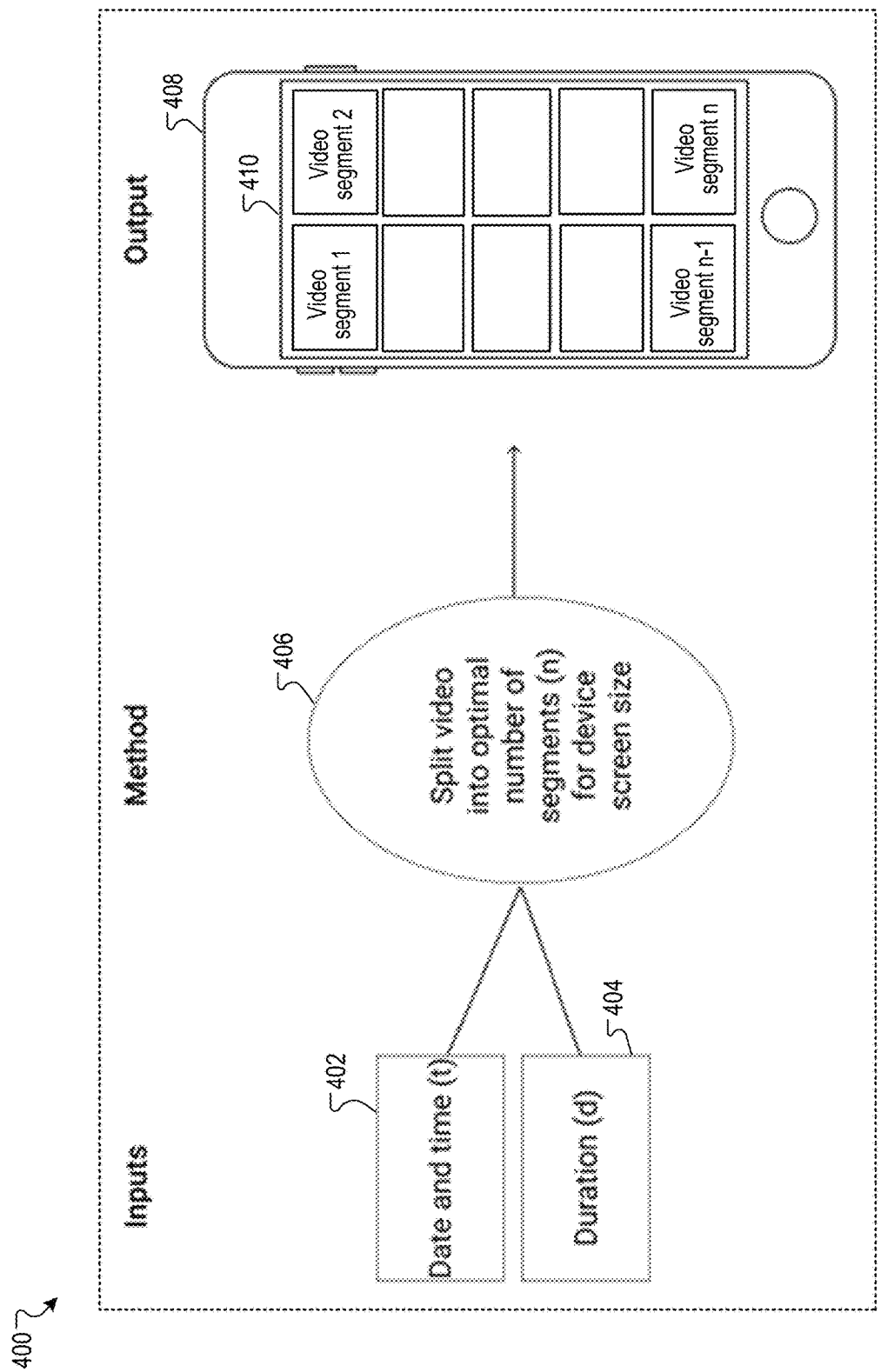
FIG. 4 shows a flow diagram for segmenting video content for output based on characteristics of a device used to output the segmented video.

FIG. 4 shows a flow diagram 400 for segmenting video content for output based on characteristics of a computing device used to output the segmented video. The example of FIG. 4 expands on prior implementations relating to simultaneous playback of sequential video segments from a continuous recording from a single or multiple cameras. Rather than rely on an input that defines the number of video segments, the system 100 is also configured to perform intelligent grid selection when generating the equal length segments. For example, the system 100 can perform intelligent grid selection based on at least one of time (402) and duration (404) inputs (e.g., from a user) to determine a number of equal length video segments to generate for a given video recording.

When segmenting video content for simultaneous playback at a computing device 140, the system 100 can perform the intelligent grid selection based on characteristics of the device 140 used to output the segmented video. In some cases the computing device may be a smartphone, as shown in the example of FIG. 4. The interface generator 185 can determine an allocation of video segments to a respective grid portion of a graphical interface and generate the graphical interface for output at a display 410 of the smartphone. In some implementations, the video segmentation engine 165 is configured to detect a screen size or type value of the computing device 140.

The video segmentation engine 165 can pass the parameter value for the screen size or type value (or both) to the interface generator 185 for determining the optimal number of video segments to display at once on the screen of the computing device (406). For example, a first set of parameters specifying device type and screen (or display) capabilities can indicate that a first device is a smartphone operable to display 8 video segments, whereas a second set of parameters specifying device type and screen (or display) capabilities can indicate that a second, different device is a tablet operable to display 16 video segments. Similarly, a third set of parameters specifying device type and screen (or display) capabilities can indicate that a third, different device is a desktop computer with display monitor operable to display 24 video segments.

In this implementation, a user may provide input indicating user interest in viewing 24 hours of video content. The video segmentation engine 165 can determine that the 24 hours of video content is to be automatically presented as 8 video segments of 3 hours each in response to a determination that parameters specifying device type and other device capabilities indicate the user will be viewing the video content on a mobile device such as a smartphone. In another implementation, the video segmentation engine 165 can determine that the 24 hours of video content is to be automatically presented as 24 one-hour segments on a display monitor of a desktop computer. Hence, the system 100 is configured to determine a number of clip segments that are optimal for a given device type and display.

Event Driven Video Segments Simultaneous Playback

Figure 5:
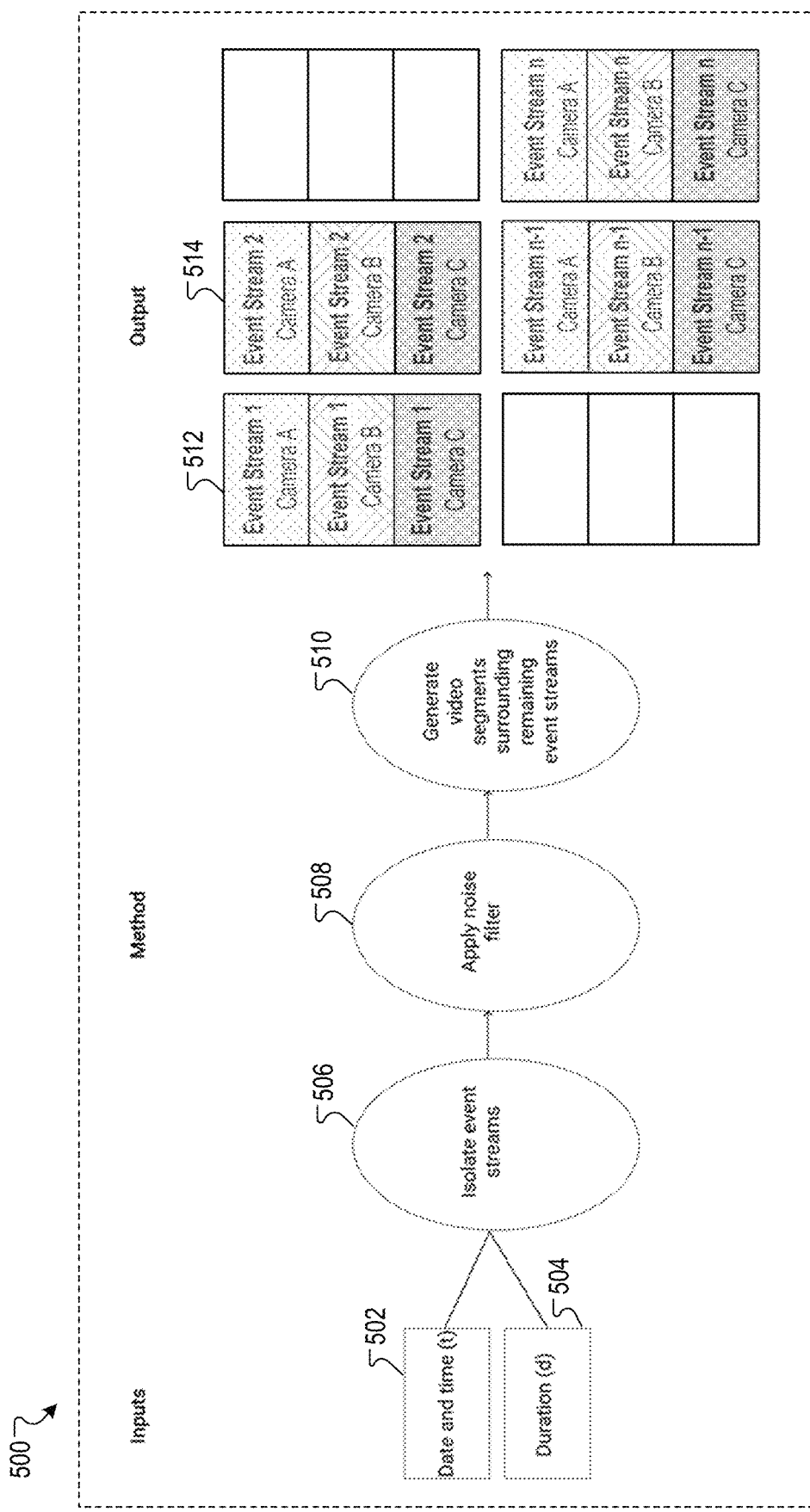
FIG. 5 shows a flow diagram for segmenting video content based on inputs specifying a particular event.

FIG. 5 shows a flow diagram 500 for segmenting video content based on inputs specifying a particular event. The techniques of flow diagram 500 for faster, event driven browsing of video segments during simultaneous playback builds upon the techniques already described in this document with reference to each of the figures discussed above. In the example of FIG. 5, the system 100 is configured to implement event driven video segmentation when performing simultaneous playback of a recording. Rather than rely solely on time (502) and duration (504) inputs from a user to determine video segments to generate for a given video recording, the system 100 uses additional variables or data values of the input criteria, such as sensor events and video analytics events, to best capture events of interest.

For example, the monitoring server 160 can process inputs such as sensor data (e.g., for detected motion) and variables (e.g., weighted toward specific event types) corresponding to different event streams. In response to processing the inputs, the monitoring server 160 refines how the video segments for respective continuous video recordings from different cameras 122 are isolated for output to a user (506). For example, the video segmentation engine 165 applies a noise filter to filter out video segments or image frames in an isolated event stream that are determined to have low relevance to one or more interests of a user (508). The video segmentation engine 165 can then generate a filtered event stream that includes video segments for remaining events that are determined to be of interest to the user.

The monitoring server 160 uses the video segmentation engine 165 to process inputs such as sensor data and variables corresponding to different event streams. For example, the video segmentation engine 165 is operable to organize sensor data and variables into groups based on temporal proximity. These groups are called event streams. The video segmentation engine 165 can perform the organizing operation based on processes executed using the event stream module 175. In some cases, an amount timespan of a single event stream will differ by a frequency of events on an account associated with the event stream. For example, a user or user account that has a few events per hour may see all the events in an hour grouped together, whereas a user with a few events per minute may notice that each event stream is only a few minutes long.

The video segmentation engine 165 can identify a set of event streams in response to organizing the sensor data and variables into the one or more groups. Once the event streams have been identified, the groups are compared against other activity on the account. For example, the video segmentation engine 165 can analyze video/image content of each event stream. Based on the analysis, the video segmentation engine 165 can determine a frequency of occurrence for a particular single event. Using the frequency of occurrence, the video segmentation engine 165 can determine that, for a given user, single events which do not occur frequently will be given a higher weighting than single events that are very frequent for the user. The system 100 can use a threshold value or other user-specific criteria to determine whether a particular single event occurs frequently or not. For example, the frequency of occurrence can be compared to a threshold frequency value to compute an output parameter specifying that a particular single event occurs frequently, such as when the frequency exceeds the threshold value.

The video segmentation engine 165 can determine that, for a given user, a string of events occurs in a particular order that is common for a given user. Based on this determination, the video segmentation engine 165 can assign a lower weighting to those commonly ordered strings of events relative to strings of events that occur in an order that is uncommon for the user. For example, the video segmentation engine 165 can identify a respective time attribute of each event in a string events based variables in a set of video data. Based on the respective time attributes for each event, the video segmentation engine 165 can determine that events which happen closer together on a temporal scale, or further apart, then average for that user will be assigned a higher weighting than events that occur within an average amount of time.

In some implementations, combinations of events that do not commonly occur within the same event stream are assigned a higher weighting than those event streams with combinations of events that do commonly occur together. As an example, a user frequently unlocks the front door, opens it, closes it, and locks the door within 1 minute. An event stream, or string of events, with this pattern would receive a relative low weighting (e.g., 0.1 or 0.2). In contrast, if the front door is unlocked, opened, left open for 15 minutes, and never locked, this event stream, including a subset of events in the string of events, would receive a high weighting (e.g., 0.8 or 0.9) since the string of events in the event stream demonstrate an uncommon pattern for the user. Other computational and analytical approaches employed by the video segmentation engine 165 are described in more detail below.

Based on the filtered event stream, the video segmentation engine 165 generates video segments surrounding the remaining events, where the video segments are of particular interest to the user (510). The video segments can be generated from continuous video recordings captured by a single camera 122 or my multiple cameras 122. For example, the segmentation module 180 is used to determine a partitioning or segmenting of video content for the remaining events into n video segments (e.g., of equal or differing sizes) for presentation in a grid or grid portion output at a display. The output is representative of a graphical interface that includes multiple grid portions and a single grid portion 512 or 514 can be used to concurrently present partitioned video segments corresponding to multiple cameras 122, such as cameras A, B, and C. In contrast to the implementations described above, this example output may not always include continuous video due to the random timing of sensor and analytics events that correspond to the remaining events used to generate the video segments.

As noted above, the video segmentation engine 165 is used by the monitoring server 160 to process inputs such as sensor data (e.g., for detected motion) and weighted (or unweighted) variables corresponding to different event streams. In some implementations, the video segmentation engine 165 processes the inputs based on computing logic such as example algorithm implemented using a machine-learning model. The computing logic can be used by the machine-learning model to infer or learn an optimal weighting of different variables of an event stream to select a particular set of frames for outputting at an interface. For example, the computing logic can be based on different key frame extraction algorithms. The computing logic can be used to determine a weighting of different unweighted variables or parameters in sensor data obtained from sensors 120 at the property 102. In this manner, the video segmentation engine 165 uses the computing logic or machine-learning model to execute the video analytics for isolating different event streams. In some implementations, the video analytics can incorporate different types of image or item recognition techniques implemented by the machine-learning model using inputs or outputs of the computing logic.

As described above, the input criteria can include time values (502), duration values (504), and other parameters/variables for filtering out portions of video content that do not align with events or an event stream of interest to a user. In some implementations, the system 100 defines additional variables for isolating event streams and filtering out portions of video content determined to have low relevance to one or more interests of a user. For example, additional variables can be input to the frame-selection algorithm or machine-learning model to infer unique event streams based on a set of user preferences. The system 100 generates video segments for simultaneous playback based on the unique event streams. As used in this document, an event stream is a connection of related events and activity represented in image frames that can be grouped to generate a video segment.

Example activity and events, as well as variables and parameters, that can be used to generate an event stream include, but are not limited to: sensor activity, device activity, and video analytics events. In some implementations, these particular types of activity and events include: person detected, animal detected, vehicle detected, and unclassified object detected. Person detected can include: number of people detected, duration of person detection, familiar person detected, and unfamiliar person detected. Animal detected can include: number of animals detected and duration of animal detection. Vehicle detected can include: number of vehicles detected, duration of vehicle detection, familiar vehicle detected, unfamiliar vehicle detected.

The example activity and events, as well as variables and parameters, that can be used to generate an event stream also include: time, geo-device data, unexpected activity flag, time of day, local power-outage data, weather data, camera location within the house (e.g., while focusing on proximity to other sensors or devices), and order of events and activity. "Time" can include: time between each sensor and video analytics event, length of time of a sensor event (e.g., between a sensor open/close), or both. Geo-device data can include: number of geo-devices within a geo-fence and a particular geo-device crossing the geo-fence.

By obtaining and determining a weighting of these variables and parameters, the monitoring server 160 can be configured to isolate event streams that are most likely to be of interest to the user as well as remove (or filter) video segments with frequently occurring event streams and expected noise. In some implementations, the approach associated with the example of FIG. 5 is best suited for users who do not know what they are looking for but do not want to wade through a monotony of frequently occurring events. For example, a company may have a camera in front of a busy street corner. The owner of the company may not want to see video segments of every vehicle that passes in front of the front door. However, if a vehicle stays in a frame for a greater than average time (e.g., 45 seconds), the owner may want to watch video segments depicting the duration of time the vehicle was positioned at the door of the company.

In addition to the noise filtering technique described above, the system 100 is configured to filter the segments on a specific event or activity. The graphical interface can then present a time ordered list of video segments containing that particular event or activity, such as an event that aligns with filtering constraints specified by a user, the system, or both. The user or system 100 can also select events as book ends to an example time frame of interest. For example, given an event that occurred while the babysitter was at the property, the video segmentation engine 165 can receive an input indicating a selection of a first event for when the babysitter arrived (e.g., door opened/closed at 7:05 PM) and a selection of a second event for when the babysitter left (e.g., door open/closed at 11:00 PM). The selected first and second events can function as bookends to provide a more precise window for viewing segments of a video recording.

Similarly, in another example, an owner of a small clothing boutique in Manhattan uses the system 100 to deter or prevent shoplifting and enhance the safety and security of the boutique. The boutique can be represented by the property 102 and can include sensors 120 (e.g., contact or motion sensors) at each of the front door and the back door of the boutique as well as a camera 122 at each door (front and back). The boutique may also include a camera pointed at a cash register and adjacent to a storage closet that holds specific types of new merchandise and a contact sensor 120 installed at an entrance of the storage closet.

The owner may detect that a new merchandise item is missing from the storage closet. The owner can then review video segments of continuous video recordings obtained using the different cameras 122 at the boutique. The video data 124 associated with these cameras can be coupled with the sensor data 125 generated from each of the contact sensors. The owner can provide inputs to system 100 indicating a selecting of a given date/time range of, for example, 4:00 PM to 9:00 PM. The system 100 can include an application program that communicates with the monitoring server 160 to generate output data for presentation to the owner/user. For example, the owner can interact with system 100 and provide the inputs to the monitoring server 160 and video segmentation engine 165 using an example "smart security" application program accessible from a computer system, such as a client device or mobile device 140.

In this example, the output data indicates there are 11 video segments for the selected data/time range: eight segments of a customer entering or exiting the front door of the boutique, two segments of an individual exiting the back door, and one of a customer standing by the front door for an extended duration. The system 100 is configured to automatically filter out video segments of a person walking by the front and back door based on input from the owner, a determination by the video segmentation engine 165, or both. In some implementations, the video segmentation engine 165 analyzes parameter values of the sensor data 125 for the contact sensor 120 against the image data 124 to isolate video event streams indicating activity at, or adjacent to, the entrance of the storage closet. The system 100 is configured to play each of the remaining video segments of the isolated streams concurrently in a graphical interface generated for display at the mobile device 140 based on the techniques described above. The owner can monitor each of the remaining video segments that are played concurrently to determine whether the new merchandise was stolen from the storage closet or simply misplaced at the another section of the boutique.

The system 100 is configured to determine whether there are more clips than can reasonably be viewed on the playback device due to screen size or data constraints. Based on this determination, the system 100 can introduce continuous scrolling through time feature. For example, the interface generator 185 can generate a graphical interface that presents thumbnails of video segments for viewing by a user. The user can preview thumbnails across all video segments to select segments of interest for simultaneous playback in a reduced grid. The system 100 can also hide video segments that were not selected for viewing by the user.

Region Constructed Video Segments Simultaneous Playback

Figure 6:
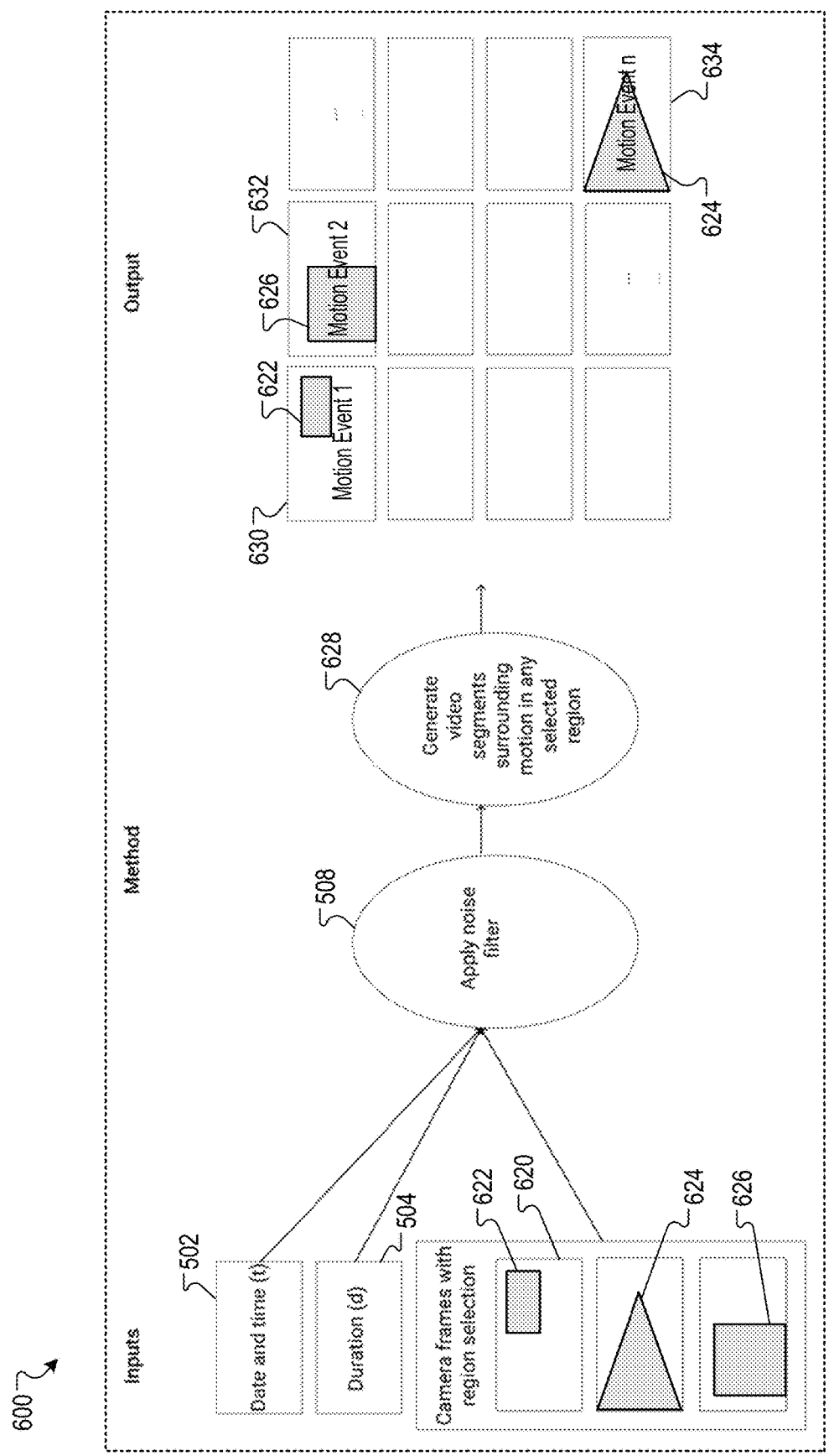
FIG. 6 shows a flow diagram for segmenting video content based on inputs specifying a particular region of interest in a video frame.

FIG. 6 shows a flow diagram 600 for segmenting video content based on inputs specifying a particular region. The techniques of flow diagram 600 builds upon the other techniques already described in this document with reference to each of the figures discussed above. In the example of FIG. 6, the system 100 is configured to implement region constructed video segmentation when performing simultaneous playback of a recording.

Rather than rely on time (502) and duration (504) inputs to determine video segments to generate for a given video recording or to generate video segments corresponding to an event stream, the system 100 uses additional variables or data values of the input criteria, such as motion detection in a specific region of each image frame, to filter out extraneous video data and best focus on specific regions in a video recording that are of interest to a user. The functionality can be used to focus on regions from continuous video recordings captured by a single camera 122 or my multiple cameras 122.

With regard to regions of focus, a particular region in video data from one or more cameras 122 can be selected based on user input, a determination by the system 100, or both. For example, distinct image frames 620 can each include a respective region 622, 624, 626 that may represent a region of focus as determined by a user, the system 100, or both. The system 100 can make the determination of selecting a particular region of focus based on inferences (e.g., machine-learning inferences) that indicate a specific region may be of particular interest to the user given one or more input criteria received by the system.

Based on the selection for a region of focus, the video segmentation engine 165 generates video segments corresponding to motion detection in the region(s) of interest (628). The motion detected in a region can be determined using the methods described for the activity indicators. For example, the amount of detected motion can be determined based on a number (or percent) of pixel changes observed in a given video segment. In some implementations, for a portion of video content, the video segmentation engine 165 is configured to filter out certain lighting changes, detected wind, frequently reoccurring event streams, and other noise elements based on static or dynamic noise thresholds. The video segmentation engine 165 can apply a respective noise threshold for each noise element.

The video segmentation engine 165 generates an output of partitioned video segments surrounding motion detected in the region(s) of interest. In some implementations, the output is a grid of video segments indicating all motion detection events matching a set of input criteria. The segmentation module 180 can determine the partitioning or segmenting of the video segments for presentation in the grid or grid portion 630, 632, 634 that is output at a display of a device. A graphical interface representing the output can be used to concurrently present partitioned video segments corresponding to multiple cameras 122. Individual grid portions 630, 632, 634 can be used to present video segments for distinct regions of focus 622, 626, 624, respectively.

Figure 7:
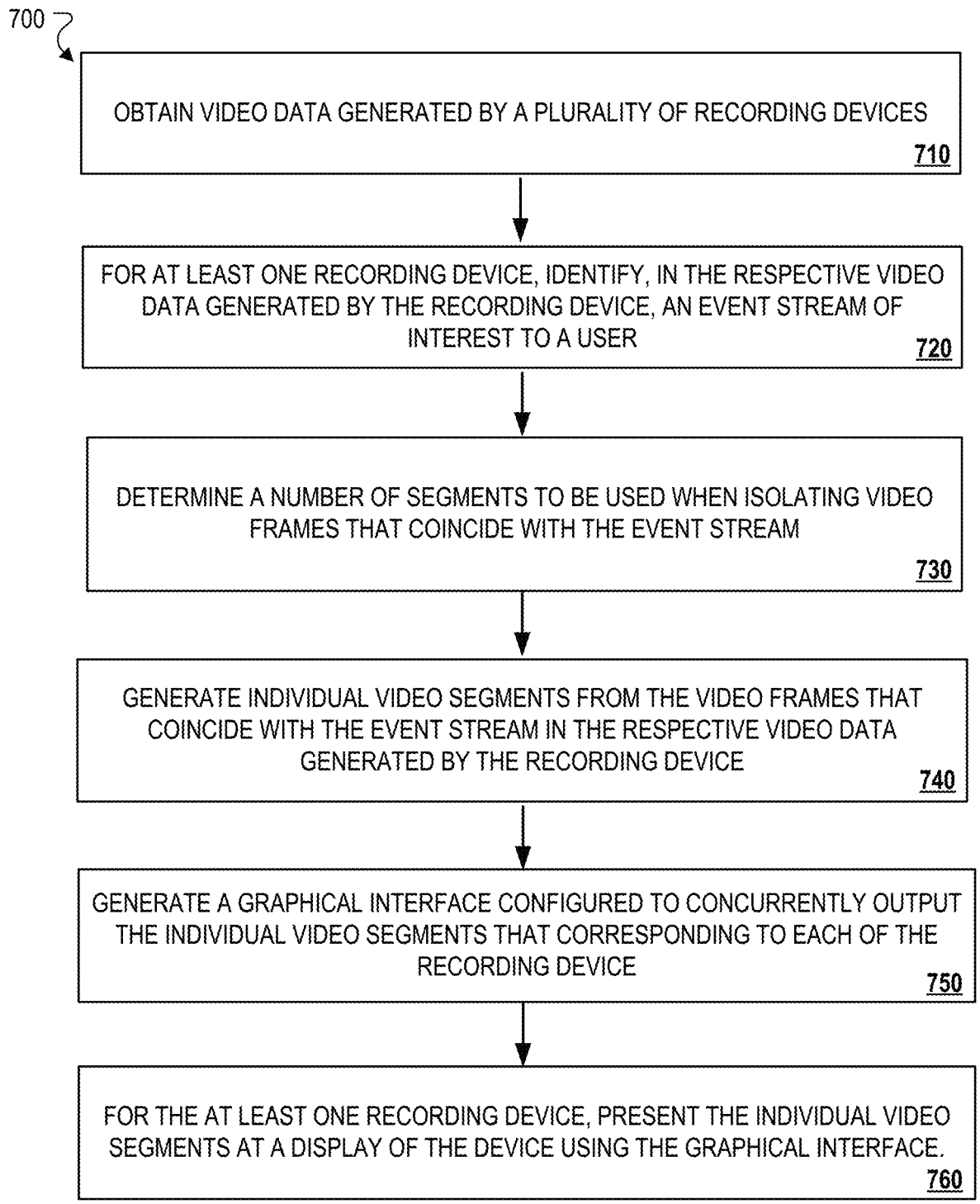
FIG. 7 shows an example process for performing simultaneous playback of continuous video recordings from multiple recording devices.

FIG. 7 shows an example process 700 for performing simultaneous playback of continuous video recordings from multiple recording devices. Process 700 can be implemented or executed using the system 100 described above. Descriptions of process 700 may reference the above-mentioned computing resources of system 100. The steps of process 700 may be enabled by programmed firmware, or software instructions, that are executable by one or more processors of the devices and resources described in this document.

Referring now to process 700, the system 100 obtains video data generated by multiple recording devices (710), such as cameras 122 and video recorders located the property 102. In addition to obtaining the video data, the system 100 may also receive and process input criteria including a time value of the video and an input variable corresponding to one or more events captured in the video data. For example, based at least on a time value, the input processor 170 can identify video data generated by a recording device and that shows one or more events. The time value may define a specific time (e.g., 1300 hrs) or a duration/window of time (e.g., 1300-1330). The time value can be user specified or determined dynamically by control logic of system 100.

For at least one of the multiple recording devices, the system 100 identifies an event stream of interest to a user in the respective video data generated by the recording device (720). For example, based on an input variable corresponding to the one or more events, the event stream module 175 can identify an event stream that coincides with occurrence of a particular event captured in the respective video data. The input variable can be set by a user, such as via a textual query of "show persons detected during 1300-1330" where the input variable is "persons" "persons detected." The particular event may be theft of a valuable item from a property or a vehicle committing a traffic infraction. The event may involve a person or various other items. In some implementations, the system 100 identifies an event stream of interest to a user in respective video data generated by each of the multiple recording devices.

For example, the video segmentation engine 165 is configured to, for each recording device, identify an event stream based on a respective time value and input variable corresponding to one or more events captured in the respective video data generated for the recording device. In some implementations, identifying an event stream includes identifying a respective event stream for each recording device. Each respective event stream can include content that is common among respective video data generated by each of the recording devices. For example, the common content can be the person involved in the theft or different angles of the specific vehicle used to commit the infraction. The graphical interface can be a single interface that concurrently outputs individual video segments generated from respective video data for two or more different recording devices.

The system 100 determines a number of segments to be used when isolating image frames that coincide (or filtering out frames that don't coincide) with the event stream corresponding to the at least one recording device (730). For example, the segmentation module 180 can determine a control value for segmenting image frames of the event stream and then determine a number of segments based on the control value. In some implementations, the control value defines a number of screens or separate video streams that are shown concurrently in a graphical interface. The system 100 can determine the control value based on information about a digital or electronic display of a computing device that will be used to present video data associated with the event stream.

For example, the system 100 can obtain or access information describing a hardware or software configuration of the display (or the computing device). The segmentation module 180 can then determine a control value based on the hardware configuration, the software configuration, or both. For example, the segmentation module 180 can determine the control value and a number of segments based at least on a size of the display, a resolution of the display, or both. In some implementations, the system 100 uses the segmentation module 180 in cooperation with the interface generator 185 to determine the control value and the number of segments.

The system 100 generates individual video segments from the video/image frames relating to the particular event (or event stream) captured in the respective video data generated by the recording device (740). More specifically, based on the control value, the system 100 isolates image frames of the event stream coinciding with the particular event and generates individual video segments using the image frames of the event stream that were isolated based on the control value. For example, the individual video segments can be generated using the image frames of the event stream that remain after other image frames are filtered based on the control value, a weighted (or unweighted) variable, or both.

In some implementations, isolating the image frames includes identifying a value of the input variable that represents a first attribute of the particular event. The first attribute can be an area where the event took place, a physical characteristic of a person involved in the event, or a make/model of a vehicle involved in the event, as an example. Based on the input variable, the system 100 can determine that a first subset of image frames coinciding with the particular event includes content that aligns with the first attribute of the particular event. Based on this determination, the system 100 can then isolate the first subset of the image frames. The system 100 can perform this analysis on respective video data generated for different camera 122 or recording device. In some cases, the system 100 generates, for a first recording device 122, a first individual video segment from the first subset of image frames and generates, for a second recording device, a second individual video segment from a second subset of image frames coinciding with the particular event. In this example, the first subset of images are isolated from respective video data generated by the first recording device, whereas the second subset of images are isolated from respective video data generated by the second recording device. The second recording device is distinct from the first recording device.

Process 700 includes generating a graphical interface configured to concurrently output the individual video segments that corresponding to each of the plurality of recording devices (750). The system 100 presents the individual video segments at a display of the computing device using the graphical interface (760). More specifically, the video segmentation engine 165 presents the individual video segments for each of the multiple recording devices concurrently at the display of the device. For example, the first individual video segment and the second individual video are presented concurrently in a single graphical interface output at a digital or electronic display or a computing device.

Figure 8:
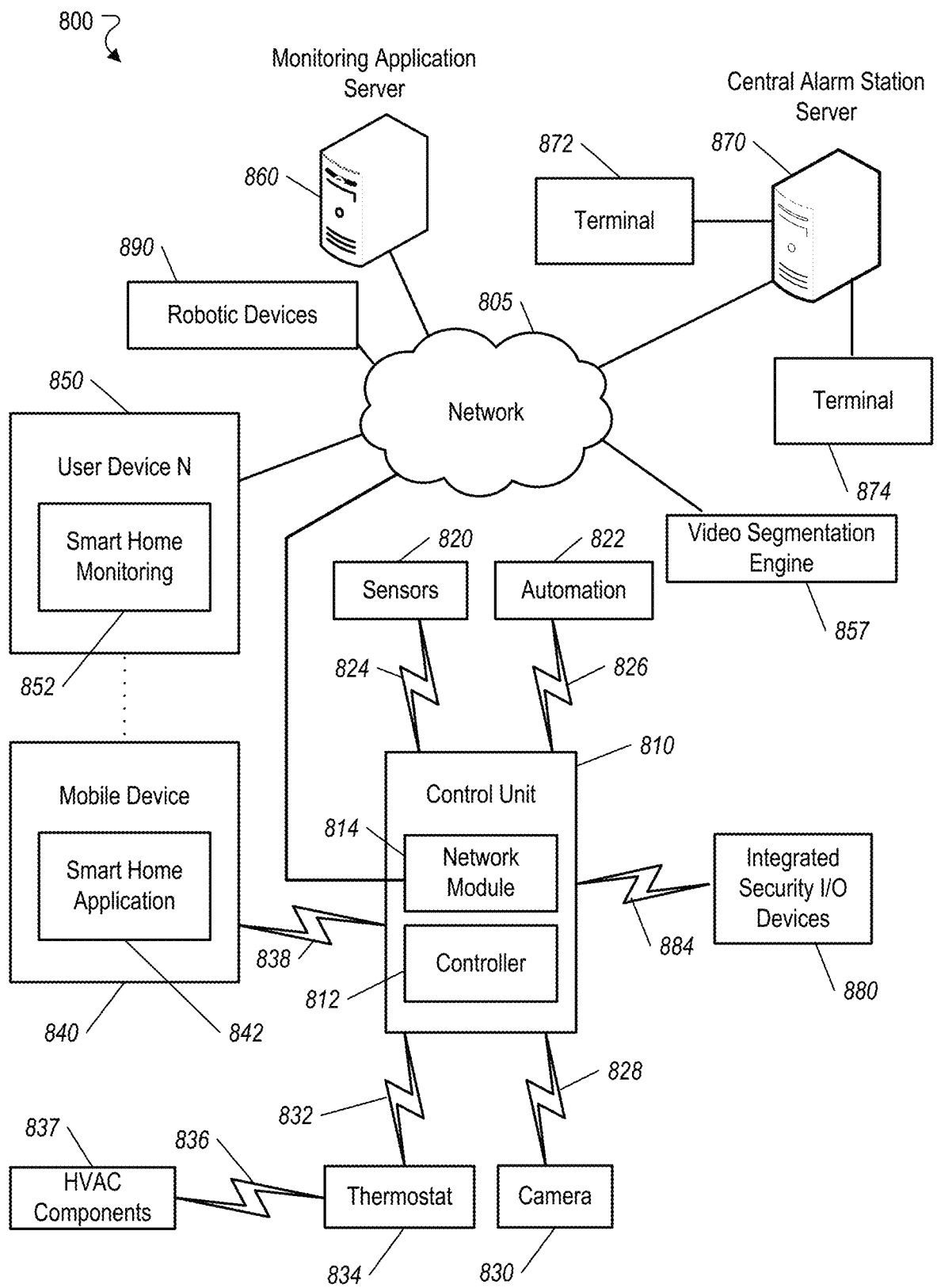
FIG. 8 shows a diagram illustrating an example property monitoring system.

FIG. 8 is a diagram illustrating an example of a property monitoring system 800. The electronic system 800 includes a network 805, a control unit 810, one or more user devices 840 and 850, a monitoring server 860, and a central alarm station server 870. In some examples, the network 805 facilitates communications between the control unit 810, the one or more user devices 840 and 850, the monitoring server 860, and the central alarm station server 870.

The network 805 is configured to enable exchange of electronic communications between devices connected to the network 805. For example, the network 805 may be configured to enable exchange of electronic communications between the control unit 810, the one or more user devices 840 and 850, the monitoring server 860, and the central alarm station server 870. The network 805 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 805 may include multiple networks or subnetworks, each of which may include, for example, a wired or wireless data pathway. The network 805 may include a circuit-switched network, a packet-switched data network, or any other network able to carry electronic communications (e.g., data or voice communications). For example, the network 805 may include networks based on the Internet protocol (IP), asynchronous transfer mode (ATM), the PSTN, packet-switched networks based on IP, x.25, or Frame Relay, or other comparable technologies and may support voice using, for example, VoIP, or other comparable protocols used for voice communications. The network 805 may include one or more networks that include wireless data channels and wireless voice channels. The network 805 may be a wireless network, a broadband network, or a combination of networks including a wireless network and a broadband network.

The control unit 810 includes a controller 812 and a network module 814. The controller 812 is configured to control a control unit monitoring system (e.g., a control unit system) that includes the control unit 810. In some examples, the controller 812 may include a processor or other control circuitry configured to execute instructions of a program that controls operation of a control unit system. In these examples, the controller 812 may be configured to receive input from sensors, flow meters, or other devices included in the control unit system and control operations of devices included in the household (e.g., speakers, lights, doors, etc.). For example, the controller 812 may be configured to control operation of the network module 814 included in the control unit 810.

The network module 814 is a communication device configured to exchange communications over the network 805. The network module 814 may be a wireless communication module configured to exchange wireless communications over the network 805. For example, the network module 814 may be a wireless communication device configured to exchange communications over a wireless data channel and a wireless voice channel. In this example, the network module 814 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 814 also may be a wired communication module configured to exchange communications over the network 805 using a wired connection. For instance, the network module 814 may be a modem, a network interface card, or another type of network interface device. The network module 814 may be an Ethernet network card configured to enable the control unit 810 to communicate over a local area network and/or the Internet. The network module 814 also may be a voice band modem configured to enable the alarm panel to communicate over the telephone lines of Plain Old Telephone Systems (POTS).

The control unit system that includes the control unit 810 includes one or more sensors. For example, the monitoring system may include multiple sensors 820. The sensors 820 may include a lock sensor, a contact sensor, a motion sensor, or any other type of sensor included in a control unit system. The sensors 820 also may include an environmental sensor, such as a temperature sensor, a water sensor, a rain sensor, a wind sensor, a light sensor, a smoke detector, a carbon monoxide detector, an air quality sensor, etc. The sensors 820 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 820 can also include a radio-frequency identification (RFID) sensor that identifies a particular article that includes a pre-assigned RFID tag.

The control unit 810 communicates with the home automation controls 822 and a camera 830 to perform monitoring. The home automation controls 822 are connected to one or more devices that enable automation of actions in the home. For instance, the home automation controls 822 may be connected to one or more lighting systems and may be configured to control operation of the one or more lighting systems. Also, the home automation controls 822 may be connected to one or more electronic locks at the home and may be configured to control operation of the one or more electronic locks (e.g., control Z-Wave locks using wireless communications in the Z-Wave protocol). Further, the home automation controls 822 may be connected to one or more appliances at the home and may be configured to control operation of the one or more appliances. The home automation controls 822 may include multiple modules that are each specific to the type of device being controlled in an automated manner. The home automation controls 822 may control the one or more devices based on commands received from the control unit 810. For instance, the home automation controls 822 may cause a lighting system to illuminate an area to provide a better image of the area when captured by a camera 830.

The camera 830 may be a video/photographic camera or other type of optical sensing device configured to capture images. For instance, the camera 830 may be configured to capture images of an area within a building or home monitored by the control unit 810. The camera 830 may be configured to capture single, static images of the area and also video images of the area in which multiple images of the area are captured at a relatively high frequency (e.g., thirty images per second). The camera 830 may be controlled based on commands received from the control unit 810.

The camera 830 may be triggered by several different types of techniques. For instance, a Passive Infra-Red (PIR) motion sensor may be built into the camera 830 and used to trigger the camera 830 to capture one or more images when motion is detected. The camera 830 also may include a microwave motion sensor built into the camera and used to trigger the camera 830 to capture one or more images when motion is detected. The camera 830 may have a "normally open" or "normally closed" digital input that can trigger capture of one or more images when external sensors (e.g., the sensors 820, PIR, door/window, etc.) detect motion or other events. In some implementations, the camera 830 receives a command to capture an image when external devices detect motion or another potential alarm event. The camera 830 may receive the command from the controller 812 or directly from one of the sensors 820.

In some examples, the camera 830 triggers integrated or external illuminators (e.g., Infra-Red, Z-wave controlled "white" lights, lights controlled by the home automation controls 822, etc.) to improve image quality when the scene is dark. An integrated or separate light sensor may be used to determine if illumination is desired and may result in increased image quality.

The camera 830 may be programmed with any combination of time/day schedules, system "arming state", or other variables to determine whether images should be captured or not when triggers occur. The camera 830 may enter a low-power mode when not capturing images. In this case, the camera 830 may wake periodically to check for inbound messages from the controller 812. The camera 830 may be powered by internal, replaceable batteries if located remotely from the control unit 810. The camera 830 may employ a small solar cell to recharge the battery when light is available. Alternatively, the camera 830 may be powered by the controller's 812 power supply if the camera 830 is co-located with the controller 812.

In some implementations, the camera 830 communicates directly with the monitoring server 860 over the Internet. In these implementations, image data captured by the camera 830 does not pass through the control unit 810 and the camera 830 receives commands related to operation from the monitoring server 860.

The system 800 also includes thermostat 834 to perform dynamic environmental control at the home. The thermostat 834 is configured to monitor temperature and/or energy consumption of an HVAC system associated with the thermostat 834, and is further configured to provide control of environmental (e.g., temperature) settings. In some implementations, the thermostat 834 can additionally or alternatively receive data relating to activity at a home and/or environmental data at a home, e.g., at various locations indoors and outdoors at the home. The thermostat 834 can directly measure energy consumption of the HVAC system associated with the thermostat, or can estimate energy consumption of the HVAC system associated with the thermostat 834, for example, based on detected usage of one or more components of the HVAC system associated with the thermostat 834. The thermostat 834 can communicate temperature and/or energy monitoring information to or from the control unit 810 and can control the environmental (e.g., temperature) settings based on commands received from the control unit 810.

In some implementations, the thermostat 834 is a dynamically programmable thermostat and can be integrated with the control unit 810. For example, the dynamically programmable thermostat 834 can include the control unit 810, e.g., as an internal component to the dynamically programmable thermostat 834. In addition, the control unit 810 can be a gateway device that communicates with the dynamically programmable thermostat 834. In some implementations, the thermostat 834 is controlled via one or more home automation controls 822.

A module 837 is connected to one or more components of an HVAC system associated with a home, and is configured to control operation of the one or more components of the HVAC system. In some implementations, the module 837 is also configured to monitor energy consumption of the HVAC system components, for example, by directly measuring the energy consumption of the HVAC system components or by estimating the energy usage of the one or more HVAC system components based on detecting usage of components of the HVAC system. The module 837 can communicate energy monitoring information 586 and the state of the HVAC system components to the thermostat 834 and can control the one or more components of the HVAC system based on commands received from the thermostat 834.

The system 800 includes one or more video segmentation engines 857. Each of the one or more video segmentation engine 857 connects to control unit 810, e.g., through network 805. The video segmentation engines 857 can be computing devices (e.g., a computer, microcontroller, FPGA, ASIC, or other device capable of electronic computation) capable of receiving data related to the sensors 820 and communicating electronically with the monitoring system control unit 810 and monitoring server 860.

The video segmentation engine 857 receives data from one or more sensors 820. In some examples, the video segmentation engine 857 can be used to determine segmentation of video streams obtained from a recording device based on an isolation of certain event streams. The isolation of the event streams can be a prerequisite for initiating simultaneous playback of continuous video recordings from multiple recording devices. The video segmentation engine 857 can perform these operations based on data generated by sensors 820 (e.g., data from image sensors 820 or other sensors describing motion, movement, acceleration/velocity, orientation, and other parameters). The video segmentation engine 857 can receive data from the one or more sensors 820 through any combination of wired and/or wireless data links. For example, the video segmentation engine 857 can receive sensor data via a Bluetooth, Bluetooth LE, Z-wave, or Zigbee data link.

The video segmentation engine 857 communicates electronically with the control unit 810. For example, the video segmentation engine 857 can send data related to the sensors 820 to the control unit 810 and receive commands related to segmenting input video data obtained from an example image sensor 820 or based on data from one or more other sensors 820. In some examples, the video segmentation engine 857 processes or generates sensor signal data, for signals emitted by the sensors 820, prior to sending it to the control unit 810. The sensor signal data can include information that indicates a user 108 has triggered recording or segmentation of input video generated by a recording device.

In some examples, the system 800 further includes one or more robotic devices 890. The robotic devices 890 may be any type of robots that are capable of moving and taking actions that assist in home monitoring. For example, the robotic devices 890 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 890 may be devices that are intended for other purposes and merely associated with the system 800 for use in appropriate circumstances. For instance, a robotic vacuum cleaner device may be associated with the monitoring system 800 as one of the robotic devices 890 and may be controlled to take action responsive to monitoring system events.

In some examples, the robotic devices 890 automatically navigate within a home. In these examples, the robotic devices 890 include sensors and control processors that guide movement of the robotic devices 890 within the home. For instance, the robotic devices 890 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 890 may include control processors that process output from the various sensors and control the robotic devices 890 to move along a path that reaches the desired destination and avoids obstacles. In this regard, the control processors detect walls or other obstacles in the home and guide movement of the robotic devices 890 in a manner that avoids the walls and other obstacles.

In addition, the robotic devices 890 may store data that describes attributes of the home. For instance, the robotic devices 890 may store a floorplan and/or a three-dimensional model of the home that enables the robotic devices 890 to navigate the home. During initial configuration, the robotic devices 890 may receive the data describing attributes of the home, determine a frame of reference to the data (e.g., a home or reference location in the home), and navigate the home based on the frame of reference and the data describing attributes of the home. Further, initial configuration of the robotic devices 890 also may include learning of one or more navigation patterns in which a user provides input to control the robotic devices 890 to perform a specific navigation action (e.g., fly to an upstairs bedroom and spin around while capturing video and then return to a home charging base). In this regard, the robotic devices 890 may learn and store the navigation patterns such that the robotic devices 890 may automatically repeat the specific navigation actions upon a later request.

In some examples, the robotic devices 890 may include data capture and recording devices. In these examples, the robotic devices 890 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 890 to take and store a biometric sample that can be used to identify the person (e.g., a biometric sample with DNA that can be used for DNA testing).

In some implementations, the robotic devices 890 may include output devices. In these implementations, the robotic devices 890 may include one or more displays, one or more speakers, and/or any type of output devices that allow the robotic devices 890 to communicate information to a nearby user.

The robotic devices 890 also may include a communication module that enables the robotic devices 890 to communicate with the control unit 810, each other, and/or other devices. The communication module may be a wireless communication module that allows the robotic devices 890 to communicate wirelessly. For instance, the communication module may be a Wi-Fi module that enables the robotic devices 890 to communicate over a local wireless network at the home. The communication module further may be a 900 MHz wireless communication module that enables the robotic devices 890 to communicate directly with the control unit 810. Other types of short-range wireless communication protocols, such as Bluetooth, Bluetooth LE, Z-wave, Zigbee, etc., may be used to allow the robotic devices 890 to communicate with other devices in the home. In some implementations, the robotic devices 890 may communicate with each other or with other devices of the system 800 through the network 805.

The robotic devices 890 further may include processor and storage capabilities. The robotic devices 890 may include any suitable processing devices that enable the robotic devices 890 to operate applications and perform the actions described throughout this disclosure. In addition, the robotic devices 890 may include solid state electronic storage that enables the robotic devices 890 to store applications, configuration data, collected sensor data, and/or any other type of information available to the robotic devices 890.

The robotic devices 890 are associated with one or more charging stations. The charging stations may be located at predefined home base or reference locations in the home. The robotic devices 890 may be configured to navigate to the charging stations after completion of tasks needed to be performed for the monitoring system 800. For instance, after completion of a monitoring operation or upon instruction by the control unit 810, the robotic devices 890 may be configured to automatically fly to and land on one of the charging stations. In this regard, the robotic devices 890 may automatically maintain a fully charged battery in a state in which the robotic devices 890 are ready for use by the monitoring system 800.

The charging stations may be contact based charging stations and/or wireless charging stations. For contact based charging stations, the robotic devices 890 may have readily accessible points of contact that the robotic devices 890 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 890 may charge through a wireless exchange of power. In these cases, the robotic devices 890 need only locate themselves closely enough to the wireless charging stations for the wireless exchange of power to occur. In this regard, the positioning needed to land at a predefined home base or reference location in the home may be less precise than with a contact based charging station. Based on the robotic devices 890 landing at a wireless charging station, the wireless charging station outputs a wireless signal that the robotic devices 890 receive and convert to a power signal that charges a battery maintained on the robotic devices 890.

In some implementations, each of the robotic devices 890 has a corresponding and assigned charging station such that the number of robotic devices 890 equals the number of charging stations. In these implementations, the robotic devices 890 always navigate to the specific charging station assigned to that robotic device. For instance, a first robotic device may always use a first charging station and a second robotic device may always use a second charging station.

In some examples, the robotic devices 890 may share charging stations. For instance, the robotic devices 890 may use one or more community charging stations that are capable of charging multiple robotic devices 890. The community charging station may be configured to charge multiple robotic devices 890 in parallel. The community charging station may be configured to charge multiple robotic devices 890 in serial such that the multiple robotic devices 890 take turns charging and, when fully charged, return to a predefined home base or reference location in the home that is not associated with a charger. The number of community charging stations may be less than the number of robotic devices 890.

Also, the charging stations may not be assigned to specific robotic devices 890 and may be capable of charging any of the robotic devices 890. In this regard, the robotic devices 890 may use any suitable, unoccupied charging station when not in use. For instance, when one of the robotic devices 890 has completed an operation or is in need of battery charge, the control unit 810 references a stored table of the occupancy status of each charging station and instructs the robotic device to navigate to the nearest charging station that is unoccupied.

The system 800 further includes one or more integrated security devices 880. The one or more integrated security devices may include any type of device used to provide alerts based on received sensor data. For instance, the one or more control units 810 may provide one or more alerts to the one or more integrated security input/output devices 880. Additionally, the one or more control units 810 may receive one or more sensor data from the sensors 820 and determine whether to provide an alert to the one or more integrated security input/output devices 880.

The sensors 820, the home automation controls 822, the camera 830, the thermostat 834, and the integrated security devices 880 may communicate with the controller 812 over communication links 824, 826, 828, 832, 838, 836, and 884. The communication links 824, 826, 828, 832, 838, and 884 may be a wired or wireless data pathway configured to transmit signals from the sensors 820, the home automation controls 822, the camera 830, the thermostat 834, and the integrated security devices 880 to the controller 812. The sensors 820, the home automation controls 822, the camera 830, the thermostat 834, and the integrated security devices 880 may continuously transmit sensed values to the controller 812, periodically transmit sensed values to the controller 812, or transmit sensed values to the controller 812 in response to a change in a sensed value.

The communication links 824, 826, 828, 832, 838, and 884 may include a local network. The sensors 820, the home automation controls 822, the camera 830, the thermostat 834, and the integrated security devices 880, and the controller 812 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 860 is an electronic device configured to provide monitoring services by exchanging electronic communications with the control unit 810, the one or more user devices 840 and 850, and the central alarm station server 870 over the network 805. For example, the monitoring server 860 may be configured to monitor events (e.g., alarm events) generated by the control unit 810. In this example, the monitoring server 860 may exchange electronic communications with the network module 814 included in the control unit 810 to receive information regarding events (e.g., alerts) detected by the control unit 810. The monitoring server 860 also may receive information regarding events (e.g., alerts) from the one or more user devices 840 and 850.

In some examples, the monitoring server 860 may route alert data received from the network module 814 or the one or more user devices 840 and 850 to the central alarm station server 870. For example, the monitoring server 860 may transmit the alert data to the central alarm station server 870 over the network 805.

The monitoring server 860 may store sensor and image data received from the monitoring system and perform analysis of sensor and image data received from the monitoring system. Based on the analysis, the monitoring server 860 may communicate with and control aspects of the control unit 810 or the one or more user devices 840 and 850.

The monitoring server 860 may provide various monitoring services to the system 800. For example, the monitoring server 860 may analyze the sensor, image, and other data to determine an activity pattern of a resident of the home monitored by the system 800. In some implementations, the monitoring server 860 may analyze the data for alarm conditions or may determine and perform actions at the home by issuing commands to one or more of the controls 822, possibly through the control unit 810.

The central alarm station server 870 is an electronic device configured to provide alarm monitoring service by exchanging communications with the control unit 810, the one or more mobile devices 840 and 850, and the monitoring server 860 over the network 805. For example, the central alarm station server 870 may be configured to monitor alerting events generated by the control unit 810. In this example, the central alarm station server 870 may exchange communications with the network module 814 included in the control unit 810 to receive information regarding alerting events detected by the control unit 810. The central alarm station server 870 also may receive information regarding alerting events from the one or more mobile devices 840 and 850 and/or the monitoring server 860.

The central alarm station server 870 is connected to multiple terminals 872 and 874. The terminals 872 and 874 may be used by operators to process alerting events. For example, the central alarm station server 870 may route alerting data to the terminals 872 and 874 to enable an operator to process the alerting data. The terminals 872 and 874 may include general-purpose computers (e.g., desktop personal computers, workstations, or laptop computers) that are configured to receive alerting data from a server in the central alarm station server 870 and render a display of information based on the alerting data. For instance, the controller 812 may control the network module 814 to transmit, to the central alarm station server 870, alerting data indicating that a sensor 820 detected motion from a motion sensor via the sensors 820. The central alarm station server 870 may receive the alerting data and route the alerting data to the terminal 872 for processing by an operator associated with the terminal 872. The terminal 872 may render a display to the operator that includes information associated with the alerting event (e.g., the lock sensor data, the motion sensor data, the contact sensor data, etc.) and the operator may handle the alerting event based on the displayed information.

In some implementations, the terminals 872 and 874 may be mobile devices or devices designed for a specific function. Although FIG. 8 illustrates two terminals for brevity, actual implementations may include more (and, perhaps, many more) terminals.

The one or more authorized user devices 840 and 850 are devices that host and display user interfaces. For instance, the user device 840 is a mobile device that hosts or runs one or more native applications (e.g., the smart home application 842). The user device 840 may be a cellular phone or a non-cellular locally networked device with a display. The user device 840 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 840 may perform functions unrelated to the monitoring system, such as placing personal telephone calls, playing music, playing video, displaying pictures, browsing the Internet, maintaining an electronic calendar, etc.

The user device 840 includes a smart home application 842. The smart home application 842 refers to a software/firmware program running on the corresponding mobile device that enables the user interface and features described throughout. The user device 840 may load or install the smart home application 842 based on data received over a network or data received from local media. The smart home application 842 runs on mobile devices platforms, such as iPhone, iPod touch, Blackberry, Google Android, Windows Mobile, etc. The smart home application 842 enables the user device 840 to receive and process image and sensor data from the monitoring system.

The user device 850 may be a general-purpose computer (e.g., a desktop personal computer, a workstation, or a laptop computer) that is configured to communicate with the monitoring server 860 and/or the control unit 810 over the network 805. The user device 850 may be configured to display a smart home user interface 852 that is generated by the user device 850 or generated by the monitoring server 860. For example, the user device 850 may be configured to display a user interface (e.g., a web page) provided by the monitoring server 860 that enables a user to perceive images captured by the camera 830 and/or reports related to the monitoring system. Although FIG. 5 illustrates two user devices for brevity, actual implementations may include more (and, perhaps, many more) or fewer user devices.

In some implementations, the one or more user devices 840 and 850 communicate with and receive monitoring system data from the control unit 810 using the communication link 838. For instance, the one or more user devices 840 and 850 may communicate with the control unit 810 using various local wireless protocols such as Wi-Fi, Bluetooth, Z-wave, Zigbee, HomePlug (ethernet over power line), or wired protocols such as Ethernet and USB, to connect the one or more user devices 840 and 850 to local security and automation equipment. The one or more user devices 840 and 850 may connect locally to the monitoring system and its sensors and other devices. The local connection may improve the speed of status and control communications because communicating through the network 805 with a remote server (e.g., the monitoring server 860) may be significantly slower.

Although the one or more user devices 840 and 850 are shown as communicating with the control unit 810, the one or more user devices 840 and 850 may communicate directly with the sensors and other devices controlled by the control unit 810. In some implementations, the one or more user devices 840 and 850 replace the control unit 810 and perform the functions of the control unit 810 for local monitoring and long range/offsite communication.

In other implementations, the one or more user devices 840 and 850 receive monitoring system data captured by the control unit 810 through the network 805. The one or more user devices 840, 850 may receive the data from the control unit 810 through the network 805 or the monitoring server 860 may relay data received from the control unit 810 to the one or more user devices 840 and 850 through the network 805. In this regard, the monitoring server 860 may facilitate communication between the one or more user devices 840 and 850 and the monitoring system.

In some implementations, the one or more user devices 840 and 850 may be configured to switch whether the one or more user devices 840 and 850 communicate with the control unit 810 directly (e.g., through link 838) or through the monitoring server 860 (e.g., through network 805) based on a location of the one or more user devices 840 and 850. For instance, when the one or more user devices 840 and 850 are located close to the control unit 810 and in range to communicate directly with the control unit 810, the one or more user devices 840 and 850 use direct communication. When the one or more user devices 840 and 850 are located far from the control unit 810 and not in range to communicate directly with the control unit 810, the one or more user devices 840 and 850 use communication through the monitoring server 860.

Although the one or more user devices 840 and 850 are shown as being connected to the network 805, in some implementations, the one or more user devices 840 and 850 are not connected to the network 805. In these implementations, the one or more user devices 840 and 850 communicate directly with one or more of the monitoring system components and no network (e.g., Internet) connection or reliance on remote servers is needed.

In some implementations, the one or more user devices 840 and 850 are used in conjunction with only local sensors and/or local devices in a house. In these implementations, the system 800 includes the one or more user devices 840 and 850, the sensors 820, the home automation controls 822, the camera 830, the robotic devices 890, and the video segmentation engine 857. The one or more user devices 840 and 850 receive data directly from the sensors 820, the home automation controls 822, the camera 830, the robotic devices 890, and the video segmentation engine 857 and sends data directly to the sensors 820, the home automation controls 822, the camera 830, the robotic devices 890, and the video segmentation engine 857. The one or more user devices 840, 850 provide the appropriate interfaces/processing to provide visual surveillance and reporting.

In other implementations, the system 800 further includes network 805 and the sensors 820, the home automation controls 822, the camera 830, the thermostat 834, the robotic devices 890, and the video segmentation engine 857 are configured to communicate sensor and image data to the one or more user devices 840 and 850 over network 805 (e.g., the Internet, cellular network, etc.). In yet another implementation, the sensors 820, the home automation controls 822, the camera 830, the thermostat 834, the robotic devices 890, and the video segmentation engine 857 (or a component, such as a bridge/router) are intelligent enough to change the communication pathway from a direct local pathway when the one or more user devices 840 and 850 are in close physical proximity to the sensors 820, the home automation controls 822, the camera 830, the thermostat 834, the robotic devices 890, and the video segmentation engine 857 to a pathway over network 805 when the one or more user devices 840 and 850 are farther from the sensors 820, the home automation controls 822, the camera 830, the thermostat 834, the robotic devices 890, and the video segmentation engine.

In some examples, the system leverages GPS information from the one or more user devices 840 and 850 to determine whether the one or more user devices 840 and 850 are close enough to the sensors 820, the home automation controls 822, the camera 830, the thermostat 834, the robotic devices 890, and the video segmentation engine 857 to use the direct local pathway or whether the one or more user devices 840 and 850 are far enough from the sensors 820, the home automation controls 822, the camera 830, the thermostat 834, the robotic devices 890, and the video segmentation engine 857 that the pathway over network 805 is required.

In other examples, the system leverages status communications (e.g., pinging) between the one or more user devices 840 and 850 and the sensors 820, the home automation controls 822, the camera 830, the thermostat 834, the robotic devices 890, and the video segmentation engine 857 to determine whether communication using the direct local pathway is possible. If communication using the direct local pathway is possible, the one or more user devices 840 and 850 communicate with the sensors 820, the home automation controls 822, the camera 830, the thermostat 834, the robotic devices 890, and the video segmentation engine 857 using the direct local pathway. If communication using the direct local pathway is not possible, the one or more user devices 840 and 850 communicate with the sensors 820, the home automation controls 822, the camera 830, the thermostat 834, the robotic devices 890, and the video segmentation engine 857 using the pathway over network 805.

In some implementations, the system 800 provides end users with access to images captured by the camera 830 to aid in decision making. The system 800 may transmit the images captured by the camera 830 over a wireless WAN network to the user devices 840 and 850. Because transmission over a wireless WAN network may be relatively expensive, the system 800 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 830). In these implementations, the camera 830 may be set to capture images on a periodic basis when the alarm system is armed in an "away" state, but set not to capture images when the alarm system is armed in a "home" state or disarmed. In addition, the camera 830 may be triggered to begin capturing images when the alarm system detects an event, such as an alarm event, a door-opening event for a door that leads to an area within a field of view of the camera 830, or motion in the area within the field of view of the camera 830. In other implementations, the camera 830 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory.

Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method, comprising:
   identifying, based on a time value, video data generated by a recording device and that shows one or more events;
   identifying, based on an input variable that is weighted to indicate events of interest to a user, an event stream that coincides with occurrence of a particular event captured in the video data;
   determining a control value that specifies N number of video segments,
   wherein the control value is determined based on information about a single display used to present portions of the video data as a collection of video segments,
   wherein N is an integer greater than or equal to 2;
   isolating image frames of the event stream that coincide with the particular event,
   wherein the image frames coinciding with the particular event are isolated based on the control value and the input variable weighted to indicate events of interest to a user;
   generating N video segments using the isolated image frames of the event stream; and
   generating instructions to cause presentation, by the single display, of a graphical interface that outputs the N video segments.

2. The method of claim 1, comprising:
   presenting, using the graphical interface, each of the N video segments concurrently at a digital display of a computing device.

3. The method of claim 1, wherein:
   identifying an event stream comprises identifying a respective event stream for each of a plurality of recording devices;
   each respective event stream includes content that is common among respective video data generated by each of the plurality of recording devices; and
   the graphical interface concurrently outputs the N video segments generated from respective video data for different recording devices among the plurality of recording devices.

4. The method of claim 1, wherein determining a control value for segmenting image frames of the event stream comprises determining a control value based on:
   i) a software configuration of the graphical interface and
   ii) a hardware configuration or a software configuration of a digital display of a computing device used to output two or more individual video segments.

5. A computer-implemented method, comprising:
identifying, based on a time value, video data generated by a recording device, among a plurality of recording devices, that shows one or more events;
identifying, based on an input variable corresponding to the one or more events, an event stream that coincides with occurrence of a particular event captured in the video data;
determining a control value for segmenting image frames of the event stream;
isolating, based on the control value, image frames of the event stream coinciding with the particular event;
generating individual video segments using the image frames of the event stream that were isolated based on the control value; and
generating a graphical interface that concurrently outputs each of the individual video segments;
identifying an event stream comprises identifying a respective event stream for each of the plurality of recording devices;
each respective event stream includes content that is common among respective video data generated by each of the plurality of recording devices; and
the graphical interface concurrently outputs individual video segments generated from respective video data for different recording devices among the plurality of recording devices, wherein the input variable is one of:
a plurality of weighted variables that represent an attribute of the particular event; and
a plurality of unweighted variables that are associated with the attribute of the particular event.

6. The method of claim 5, wherein isolating the image frames comprises:
identifying a value of the input variable that represents a first attribute of the particular event;
determining, based on the input variable, that a first subset of image frames coinciding with the particular event includes content that aligns with the first attribute of the particular event; and
in response to determining, isolating the first subset of the image frames.

7. The method of claim 6, wherein generating individual video segments comprises:
generating, for a first recording device, a first individual video segment from the first subset of image frames.

8. The method of claim 7, wherein isolating the image frames comprises:
determining, based on the input variable, that a second subset of image frames coinciding with the particular event includes content that aligns with the first attribute of the particular event; and
isolating the second subset of image frames based on the determination that content of the second subset of image frames aligns with the first attribute of the particular event.

9. The method of claim 8, wherein generating individual video segments comprises:
generating, for a second recording device, a second individual video segment from the second subset of image frames coinciding with the particular event.

10. The method of claim 9, wherein:
the first subset of images are isolated from respective video data generated by the first recording device;
the second subset of images are isolated from respective video data generated by the second recording device; and
the second recording device is distinct from the first recording device.

11. The method of claim 10, wherein:
the graphical interface is a single graphical interface; and
the method comprises, concurrently presenting in the single graphical interface output at an electronic display:
the first individual video segment generated for the first recording device from the first subset of image frames; and
the second individual video segment generated for the second recording device from the second subset of image frames.

12. A system, comprising:
a processing device; and
a non-transitory machine-readable storage device storing instructions that are executable by the processing device to cause performance of operations comprising:
identifying, based on a time value, video data generated by a recording device and that shows one or more events;
identifying, based on an input variable that is weighted to indicate events of interest to a user, an event stream that coincides with occurrence of a particular event captured in the video data;
determining a control value that specifies N number of video segments,
wherein the control value is determined based on information about a single display used to present portions of the video data as a collection of video segments,
wherein N is an integer greater than or equal to 2;
isolating image frames of the event stream that coincide with the particular event,
wherein the image frames coinciding with the particular event are isolated based on the control value and the input variable weighted to indicate events of interest to a user;
generating N video segments using the isolated image frames of the event streams; and
generating instructions to cause presentation, by the single display, of a graphical interface that outputs the N video segments.

13. The system of claim 12, comprising:
presenting, using the graphical interface, each of the N video segments concurrently at a single digital display of a computing device.

14. The system of claim 12, wherein:
identifying an event stream comprises identifying a respective event stream for each of a plurality of recording devices;
each respective event stream includes content that is common among respective video data generated by each of the plurality of recording devices; and
the graphical interface concurrently outputs the N video segments generated from respective video data for different recording devices among the plurality of recording devices.

15. A system, comprising:
a processing device; and
a non-transitory machine-readable storage device storing instructions that are executable by the processing device to cause performance of operations comprising:
identifying, based on a time value, video data generated by a recording device, among a plurality of recording devices, that shows one or more events;

identifying, based on an input variable corresponding to the one or more events, an event stream that coincides with occurrence of a particular event captured in the video data;

determining a control value for segmenting image frames of the event stream;

isolating, based on the control value, image frames of the event stream coinciding with the particular event;

generating individual video segments using the image frames of the event stream that were isolated based on the control value;

generating a graphical interface that concurrently outputs each of the individual video segments; and identifying an event stream comprises identifying a respective event stream for each of the plurality of recording devices;

each respective event stream includes content that is common among respective video data generated by each of the plurality of recording devices; and the graphical interface concurrently outputs individual video segments generated from respective video data for different recording devices among the plurality of recording devices, wherein the input variable is one of:

a plurality of weighted variables that represent an attribute of the particular event; and a plurality of unweighted variables that are associated with the attribute of the particular event.

16. The system of claim 15, wherein isolating the image frames comprises:

identifying a value of the input variable that represents a first attribute of the particular event;

determining, based on the input variable, that a first subset of image frames coinciding with the particular event includes content that aligns with the first attribute of the particular event; and in response to determining, isolating the first subset of the image frames.

17. The system of claim 16, wherein generating individual video segments comprises:

generating, for a first recording device, a first individual video segment from the first subset of image frames.

18. The system of claim 17, wherein isolating the image frames comprises:

determining, based on the input variable, that a second subset of image frames coinciding with the particular event includes content that aligns with the first attribute of the particular event; and isolating the second subset of image frames based on the determination that content of the second subset of image frames aligns with the first attribute of the particular event.

19. The system of claim 18, wherein generating individual video segments comprises:

generating, for a second recording device, a second individual video segment from the second subset of image frames coinciding with the particular event.

20. The system of claim 19, wherein:

the first subset of images are isolated from respective video data generated by the first recording device;

the second subset of images are isolated from respective video data generated by the second recording device; and the second recording device is distinct from the first recording device.

* * * * *

UNITED STATES PATENT AND TRADEMARK OFFICE
CERTIFICATE OF CORRECTION

| | | |
|---|---|---|
| PATENT NO. | : 12,008,812 B2 | |
| APPLICATION NO. | : 17/490834 | |
| DATED | : June 11, 2024 | |
| INVENTOR(S) | : Meredith Arrison, Sean Gallahan and Adam Brandfass | |

It is certified that error appears in the above-identified patent and that said Letters Patent is hereby corrected as shown below:

In the Claims

In Claim 12, Column 30, Line 41, delete "streams;" and insert -- stream; --.

Signed and Sealed this
Sixth Day of August, 2024

Katherine Kelly Vidal
*Director of the United States Patent and Trademark Office*